United States Patent
Lee et al.

(10) Patent No.: US 9,865,078 B2
(45) Date of Patent: Jan. 9, 2018

(54) IMAGE PROCESSING METHOD AND APPARATUS WITH ADAPTIVE SAMPLING

(71) Applicant: Samsung Electronics Co., Ltd., Suwon-si (KR)

(72) Inventors: Wonjong Lee, Seoul (KR); Youngsam Shin, Hwaseong-si (KR); Seokjoong Hwang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 113 days.

(21) Appl. No.: 14/939,263

(22) Filed: Nov. 12, 2015

(65) Prior Publication Data

US 2016/0314610 A1   Oct. 27, 2016

(30) Foreign Application Priority Data

Apr. 23, 2015  (KR) .................. 10-2015-0057270

(51) Int. Cl.
*G06T 15/06* (2011.01)
*G06T 15/00* (2011.01)

(52) U.S. Cl.
CPC ............ *G06T 15/06* (2013.01); *G06T 15/005* (2013.01)

(58) Field of Classification Search
USPC ..................................... 345/426, 422, 423
See application file for complete search history.

(56) References Cited

U.S. PATENT DOCUMENTS

| | | | | |
|---|---|---|---|---|
| 8,040,352 B2 * | 10/2011 | Busch | ................... | G06T 15/08 345/424 |
| 8,836,695 B2 | 9/2014 | Park et al. | | |
| 9,218,689 B1 * | 12/2015 | Baldwin | ................. | G06T 17/10 |
| 2002/0171658 A1 * | 11/2002 | Ramani | .................. | G06T 15/00 345/558 |
| 2002/0180748 A1 * | 12/2002 | Popescu | ............... | G06T 15/205 345/582 |
| 2007/0269137 A1 * | 11/2007 | Ida | ........................ | G06T 3/4053 382/299 |
| 2009/0153556 A1 * | 6/2009 | Nam | ...................... | G06T 15/06 345/421 |
| 2009/0180033 A1 * | 7/2009 | Chang | .................... | H04N 19/51 348/720 |

(Continued)

FOREIGN PATENT DOCUMENTS

| | | |
|---|---|---|
| JP | 2007-528769 A | 10/2007 |
| KR | 10-2011-0089565 A | 8/2011 |
| KR | 10-2011-0093404 A | 8/2011 |

OTHER PUBLICATIONS

Vaidyanathan, Karthik et al. "Coarse Pixel Shading." High Performance Graphics Conference, Lyon, France, Jun. 23, 2014, 10 pages in English.

*Primary Examiner* — Kimbinh T Nguyen
(74) *Attorney, Agent, or Firm* — Harness, Dickey & Pierce, P.L.C.

(57) ABSTRACT

According to a method of processing an image, respective sampling rates of each tile included in a second frame is determined based on a corresponding rendering result of a first frame, and a pixel rendering process to implement rendering of pixels included in the second frame is selected by using geometric information of reference pixels of the second frame. The reference pixels of the second frame may be selected based on the respectively determined sampling rates.

20 Claims, 19 Drawing Sheets

(56) References Cited

U.S. PATENT DOCUMENTS

| | | | |
|---|---|---|---|
| 2013/0050213 A1* | 2/2013 | McCombe | G06T 15/06 345/426 |
| 2013/0271465 A1* | 10/2013 | Clarberg | G06T 15/80 345/426 |
| 2014/0247277 A1 | 9/2014 | Guenter et al. | |
| 2014/0292757 A1* | 10/2014 | Tokuyoshi | G06T 15/50 345/426 |
| 2014/0327671 A1* | 11/2014 | Nystad | G06T 15/005 345/426 |
| 2015/0262409 A1* | 9/2015 | Morgan | G06T 15/60 345/421 |
| 2017/0103567 A1* | 4/2017 | Peterson | G06T 15/06 |

* cited by examiner

IMAGE PROCESSING METHOD AND APPARATUS WITH ADAPTIVE SAMPLING

CROSS-REFERENCE TO RELATED APPLICATION

This application claims the benefit of Korean Patent Application No. 10-2015-0057270, filed on Apr. 23, 2015, in the Korean Intellectual Property Office, the disclosure of which is incorporated herein in its entirety by reference.

BACKGROUND

1. Field

One or more embodiments relate to image processing methods and apparatuses with adaptive sampling.

2. Description of Related Art

Among processes implemented for rendering a three-dimensional (3D) model, ray tracing may include reversely tracing a direction of rays by performing an operation of checking the collision of rays corresponding to each pixel of a camera view frame with an object in the camera view.

Through ray tracing, a reflective object such as glass or a smooth metallic surface can be presented well, and thus the quality of a rendered image is good. However, a large number of operations need to be performed for the collision checking to trace reflection or penetration paths of a ray, and thus, hardware performance typically needs to be good to render a 3D model through ray tracing.

SUMMARY

One or more embodiments include image processing methods and apparatuses with adaptive sampling, noting that embodiments are not limited thereto.

One or more embodiments provide an image processing method, the method including determining a sampling rate for a tile of a second frame based on a rendering result of a first frame, selecting reference pixels from the tile of the second frame based on the determined sampling rate, obtaining geometric information of the reference pixels by performing ray tracing on the reference pixels, and obtaining geometric information of an intermediate pixel of the tile by selecting, based on the obtained geometric information of the reference pixels, a pixel rendering process to render the intermediate pixel and performing the selected pixel rendering process for the intermediate pixel.

The selecting of the pixel rendering process may include selecting between one of ray tracing the intermediate pixel to obtain the geometric information of the intermediate pixel and interpolating the intermediate pixel based on two or more of the reference pixels to obtain the geometric information of the intermediate pixel.

The sampling rate of the tile of the second frame may be selectively, based on a determined similarity of a tile of the first frame that is determined to correspond to the tile of the second frame, determined to be one of lower than a sampling rate used to render a corresponding tile of the first frame, higher than the sampling rate used to render the corresponding tile of the first frame, and same as the sampling rate used to render the corresponding tile of the first frame.

In the determining of the sampling rate for the tile of the second frame, the sampling rate for the tile of the second frame may be determined to be lower than a sampling rate used to render a corresponding tile of the first frame when a determined similarity of the corresponding tile of the first frame is determined to meet a first threshold, and the sampling rate for the tile of the second frame may be determined to be higher than the sampling rate used to render the corresponding tile of the first frame when the determined similarity of the corresponding tile of the first frame is determined to not meet a second threshold.

The determined similarity of the corresponding tile of the first frame may be a previously determined similarity between selected reference pixels of the corresponding tile of the first frame calculated based on obtained geometric information of the selected reference pixels of the corresponding tile of the first frame and intermediate pixels of the first frame adjacent to the selected reference pixels of the corresponding tile of the first frame.

The method may further include obtaining a previously determined similarity and previously determined importance of a tile of the first frame that is determined to correspond to the tile of the second frame, wherein the determining of the sampling rate for the tile of the second frame may include determining the sampling rate for the tile of the second frame based on the obtained similarity and importance.

The determining of the sampling rate for the tile of the second frame may be based on a determination of whether the obtained similarity is determined to meet a threshold, with the threshold being greater when the obtained importance of the first tile meets an importance threshold compared to when the obtained importance of the first tile is determined to not meet the importance threshold.

The method may further include obtaining a previously determined similarity and previously determined importance of a tile of the first frame that is determined to correspond to the tile of the second frame, wherein the selecting of the pixel rendering process may include selecting the pixel rendering process based on a determined similarity between the reference pixels, determination of the similarity between the reference pixels being dependent on the obtained importance.

The selecting of the pixel rendering process may further include determining whether the obtained importance meets an importance threshold, and, based on a result of the determining of whether the obtained importance meets the importance threshold, selecting between using one of a greater, lesser, or same similarity threshold between the reference pixels to select a first pixel rendering process, instead of selecting a second pixel rendering process, to render the intermediate pixel compared to a similarity threshold between reference pixels of the tile of the first frame that was used to control which of the first pixel rendering process and the second pixel rendering process was selected to render an intermediate pixel of the tile of the first frame.

The method may further include obtaining a previously determined similarity and previously determined importance of a tile of the first frame that is determined to correspond to the tile of the second frame, wherein the determining of the sampling rate of the second tile may include determining the sampling rate of the second tile based on the obtained similarity and obtained importance, and the selecting of the pixel rendering process may include selecting the pixel rendering process based on the obtained importance and a determined similarity between the reference pixels.

The selecting of the pixel rendering process may include selectively implementing a linear interpolation pixel rendering process to render the intermediate pixel of the second frame.

The method may further include dividing each of plural tiles included in the first frame into pixel blocks, respectively including a plurality of pixels, and selecting a respective reference pixel of the first frame from each of the pixel blocks, calculating respective similarities between the reference pixels of the first frame and/or intermediate pixels of the first frame adjacent to the reference pixels of the first frame based on determined geometric information of the reference pixels of the first frame, and selecting respective pixel rendering processes to render the intermediate pixels of the first frame based on the calculated respective similarities, wherein the determining of the sampling rate for the second tile may include determining respective sampling rates for each tile included in the second frame based on the calculated respective similarities.

One or more embodiments provide a non-transitory computer-readable recording medium including computer readable code to control at least one processing device to implement one or more embodiments described herein.

One or more embodiments provide an image processing apparatus, the apparatus including a determination unit configured to determine a sampling rate for a of tile of a second frame based on a rendering result of a first frame and to select reference pixels from the tile of the second frame based on the determined sampling rate, and a selection unit configured to select, based on determined geometric information of the reference pixels, a pixel processing process to render an intermediate pixel included in the second frame, wherein the determined geometric information the reference pixels is obtained by performing respective ray tracing for each of the reference pixels.

The determining unit may determine the sampling rate for the tile of the second frame to be lower than a sampling rate used to render a corresponding tile of the first frame when a determined similarity of the corresponding tile of the first frame is determined to meet a first threshold, and the sampling rate for the tile of the second frame may be determined to be higher than the sampling rate used to render the corresponding tile of the first frame when the determined similarity of the corresponding tile of the first frame is determined to not meet a second threshold.

The determined similarity of the corresponding tile of the first frame may be a previously determined similarity between selected reference pixels of the corresponding tile of the first frame calculated based on obtained geometric information of the selected reference pixels of the corresponding tile of the first frame and intermediate pixels of the first frame adjacent to the selected reference pixels of the corresponding tile of the first frame.

The determination unit may be configured to obtain a previously determined similarity and previously determined importance of a tile of the first frame, determined to correspond to the tile of the second frame, from a memory, and to determine the sampling rate for the tile of the second frame based on the obtained similarity and importance.

The determination unit may be configured to determine the sampling rate for the tile of the second frame based on a determination of whether the obtained similarity meets a threshold, with the threshold being greater when the obtained importance of the first tile is determined to meet an importance threshold compared to when the obtained importance of the first tile is determined to not meet the importance threshold.

The selection unit may be configured to obtain a previously determined importance of a tile of the first frame, that is determined to correspond to the tile of the second frame, from a memory and to select the pixel rendering process based on a determined similarity between the reference pixels, determination of the similarity between the reference pixels being dependent on the obtained importance.

The selection unit may be configured to determine whether the obtained importance meets an importance threshold and to, based on a result of the determining of whether the obtained importance meets the importance threshold, select between using one of a greater, lesser, or same similarity threshold between the reference pixels to select a ray tracing pixel rendering process, instead of selecting an interpolation pixel rendering process, to render an intermediate pixel compared to a similarity threshold between reference pixels of the tile of the first frame that was used to control which of the ray tracing pixel rendering process and the interpolation pixel rendering process was selected to render an intermediate pixel of the tile of the first frame.

The determination unit may be configured to divide each of plural tiles included in the first frame into pixel blocks, respectively including a plurality of pixels, and select a respective reference pixel of the first frame from each of the pixel blocks, and the selection unit may be configured to calculate respective similarities between the reference pixels of the first frame and/or intermediate pixels of the first frame adjacent to the reference pixels of the first frame based on determined geometric information of the reference pixels of the first frame and store the calculated respective similarities in a memory, to select respective pixel rendering processes to render the intermediate pixels of the first frame based on the calculated respective similarities, to obtain the calculated respective similarities from the memory, and determine respective sampling rates of each tile included in the second frame based on the obtained calculated respective similarities.

The apparatus may further include a ray tracing unit configured to perform the respective ray tracing for each of the reference pixels, and an interpolation unit configured to perform linear interpolation for one or more pixels of the second frame.

Additional and/or other aspects will be set forth in part in the description which follows and, in part, will be apparent from the description, or may be learned by practice of the presented embodiments

BRIEF DESCRIPTION OF THE DRAWINGS

These and/or other aspects will become apparent and more readily appreciated from the following description of one or more embodiments, taken in conjunction with the accompanying drawings in which.

DETAILED DESCRIPTION

Figure 1:
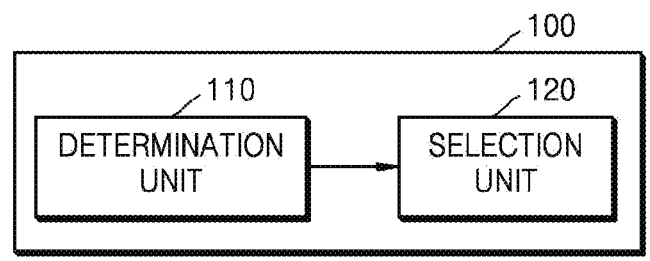
FIG. 1 illustrates an image processing apparatus, according to one or more embodiments.

The following detailed description is provided to assist the reader in gaining a comprehensive understanding of the methods, apparatuses, and/or systems described herein. However, after an understanding of the present disclosure, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that may be well known to one of ordinary skill in the art may be omitted for increased clarity and conciseness.

The features described herein may be embodied in different forms, and are not to be construed as being limited to the examples described herein.

Various alterations and modifications may be made to the described embodiments, some of which will be illustrated in detail in the drawings and detailed description. However, it should be understood that these embodiments are not construed as limited to the illustrated forms and include all changes, equivalents, or alternatives within the idea and the technical scope of this disclosure.

Terms used herein are to merely explain specific embodiments, thus it is not meant to be limiting. A singular expression includes a plural expression except when two expressions are contextually different from each other. For example, as used herein, the singular forms "a," "an" and "the" are intended to include the plural forms as well, unless the context clearly indicates otherwise. Herein, a term "include" or "have" are also intended to indicate that characteristics, figures, operations, components, or elements disclosed on the specification or combinations thereof exist. The term "include" or "have" should be understood so as not to pre-exclude existence of one or more other characteristics, figures, operations, components, elements or combinations thereof or additional possibilities.

Unless otherwise defined, all terms including technical and scientific terms used herein have the same meaning as commonly understood by one of ordinary skill in the art to which this invention belongs, in view of the present disclosure. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, certain embodiments will be explained in more detail with reference to the attached drawings, wherein like reference numerals refer to like elements throughout. Like or the same component or components corresponding to each other will be provided with the same reference numeral, and their detailed explanation will be omitted. When it is determined that a detailed description of a related or known function or configuration may make a purpose of an embodiment of the present disclosure unnecessarily ambiguous, such a detailed description may be omitted.

FIG. 1 illustrates an image processing apparatus 100, according to one or more embodiments.

Referring to FIG. 1, the image processing apparatus 100 includes a determination unit 110 and a selection unit 120. The image processing apparatus 100 may select a pixel rendering process to implement to render pixels in a second frame that is based on a rendering of a previous first frame. In other words, the image processing apparatus 100 selects a pixel rendering process to implement, among available pixel rendering processes or approaches, to render pixels of the second frame based on information generated when the first frame is rendered. As only an example, based on rendering results of the rendering of the first frame, the determination unit 110 may determine a differing number and selection of pixels to use to render a tile of the second frame compared to a number and selection of pixels that were used to render a tile of the first frame, and the selection unit 120 may selectively implement differing pixel rendering processes to generate geometric information for each of the pixels of the tile of the second frame based on the selection of pixels to use to render the tile of the second frame.

The first frame and the second frame may include or represent a same object that is continuously rendered, such as an object that is included in time sequential frames. Based on an expected similarity between a rendering result of an object in the first frame and a rendering result of the object in the second frame, the image processing apparatus 100 may select a pixel rendering process, of different available rendering processes, to implement to render the pixels of the second frame taking into consideration the rendering result of the first frame. Operations of the determination unit 110 and selection unit 120 will be set forth in greater detail below at least with reference to FIGS. 2-4.

Figure 2:
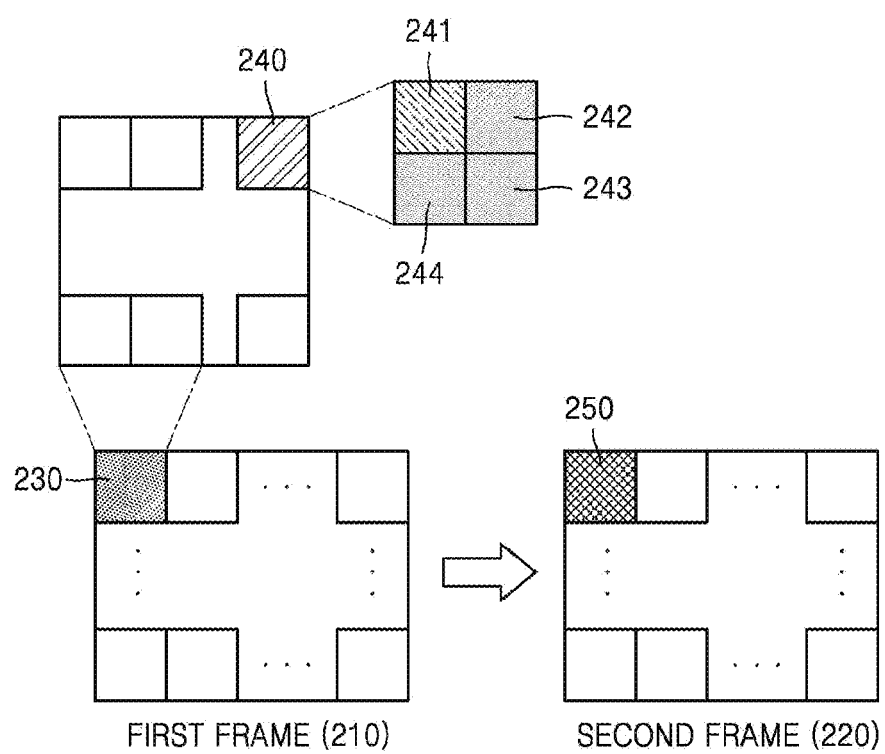
FIG. 2 illustrates a diagram explaining a first frame and a second frame, according to one or more embodiments.

FIG. 2 illustrates a diagram for explaining a first frame 210 and a subsequent second frame 220, according to one or more embodiments.

FIG. 2 illustrates the first frame 210 and the second frame 220. Hereinafter, in this example, it is assumed that the second frame 220 is rendered after rendering of the first frame 210 is completed, and in an embodiment the second frame 220 may be rendered immediately after the rendering of the first frame 210. As an example, the first frame 210 and the second frame 220 may be respectively rendered in tile units.

The first frame 210 and the second frame 220 may be divided into tiles respectively including a plurality of pixels. For example, when it is assumed that the first frame 210 includes 1024*768 pixels, the first frame 210 may be divided into 768 tiles including 32*32 pixels.

Also, each tile may be divided into a plurality of pixel blocks, with a plurality of pixels being included in each pixel block. For example, when it is assumed that a first tile 230 included in the first frame 210 includes 32*32 pixels, the first tile 230 may be divided into 256 pixel blocks that each include 2*2 pixels. In other words, a pixel block 240 included in the first tile 230 may include four pixels 241, 242, 243, and 244. The determination unit 110, to be described in greater detail further below, may have divided the first tile 230 into the plurality of pixel blocks based on a sampling rate determined by the determining unit 110 before rendering the first frame 210, or first tile 230. Accordingly, if the sampling rate were to be changed for a subsequent frame or tile, the number of pixels included in a pixel block of that subsequent tile in the subsequent frame would be different from the number of pixels included in the pixel block of the first tile 230.

Returning to the first tile 230, during a rendering of the first tile 230 the determination unit 110 may select any one of the pixels, for example, the pixel 241 included in the pixel block 240 to be a reference pixel. Hereinafter, among the pixels 241, 242, 243, and 244, the pixels 242, 243, and 244 excluding the reference pixel 241 are defined as intermediate pixels.

With regard to the illustrated second tile 250 of the second frame 220, when rendering the second frame 220 or the second tile 250, the determination unit 110 may divide the second tile 250 into a plurality of pixel blocks based on a determined sampling rate, which may be the same or different from the sampling rate of the first tile 230. Hereinafter, it is assumed that the first tile 230 means any one of the tiles included in the first frame 210, and the second tile 250 means a tile corresponding to the first tile 230 from among a plurality of tiles included in the second frame 220. As only an example, the correspondence between the first tile 230 and the second tile 250 may be that they represent pixels of a same area or portion of a same object.

Referring back to FIG. 1, the determination unit 110 determines respective sampling rates for tiles included in the second frame 220 based on the rendering performed for the first frame 210. A rendering result of the first frame 210 hereinafter means information generated when the image processing apparatus 100 renders the first frame 210.

Also, the rendering result of the first frame 210 may include similarity and/or importance information for each tile included in the first frame 210. For example, the similarity information for a tile may be a degree indicating how similar rendering results of the pixels included in the first tile are to each other. That is, as the rendering results of the pixels included in the first tile become more similar, the similarity for the first tile becomes higher. The importance information for the first tile indicates how accurately the pixels included in the first tile are rendered, e.g., based on the importance of the first tile. That is, as the importance of the first tile becomes higher, the pixels included in the first tile may be more accurately rendered. For example, a tile in an outer periphery of the frame may have a lower importance than a tile in a center portion of the frame, so more rendering resources may be provided to rendering pixels included in the center portion tile than rendering pixels in the outer periphery tile. In an embodiment, this increase of rendering resources may mean that all pixels of the center portion tile are rendered using a ray tracing rendering process, while most or all pixels of the outer periphery tile are rendered using an interpolation rendering process, as only an example.

Again, and as only an example, with regard to the second frame 220, the respective sampling rate may be a rate at which respective pixels are selected or grouped according to pixel blocks for each of the tiles included in the second frame 220. That is, the determination unit 110 may select at least one of the pixels included in the second tile 250 based on the determined sampling rate to be a reference pixel for the second tile 250. For example, when it is assumed that the sampling rate is 2*2, the determination unit 110 may divide the second tile 250 into pixel blocks including 2*2 pixels (that is, four pixels), with potentially at least one pixel from each pixel block being a reference pixel.

In this case, the determination unit 110 may determine the sampling rates of the tiles included in the second frame based on the rendering result of the first frame 210. For example, if the similarity of the first tile 230 is determined to be high, the determination unit 110 may decrease the sampling rate for the rendering of the second tile 250, thereby increasing the pixel block sizes, or said another way, decreasing the number of pixel blocks by increasing the number of pixels included in each pixel block. As another example, if the importance of the first tile 230 is determined to be high, the determination unit 110 may increase the sampling rate of the second tile 250, thereby decreasing the pixel block sizes, or said another way, increasing the number of pixel blocks by decreasing the number of pixels included in each pixel block. Decreasing the sampling rate for the second tile 250 by the determination unit 110 means that the sampling rate used to render the second tile 250 is lower than the sampling rate that will be used to render the first tile 230.

For example, when the first tile 230 is divided into pixel blocks of 2*2 pixels and is determined to have a high similarity, the determination unit 110 may divide the second tile 250 into pixel blocks of 3*3 pixels (that is, the sampling rate of the second tile 250 is decreased compared to the sampling rate of the first tile 230).

The determination unit 110 may select one or more reference pixels from each of the tiles included in the second frame 220 based on the respectively determined sampling rates for rendering the second frame 220. One sampling rate may be chosen for all tiles of the second frame 220, or a sampling rate may be determined for each tile of the second frame 220. As noted, the determination unit 110 may select one reference pixel from each of respective pixel blocks included in the second tile 250. If the second tile 250 is formed of 32*32 pixels and divided into pixel blocks of 2*2 pixels, the number of reference pixels selected in the second tile 250 by the determination unit 110 may be 256. In this case, for each of the pixels blocks of the second tile 250, the three remaining pixels, other than the selected reference pixel, are defined as intermediate pixels.

For the rendering of the second frame 220, the selection unit 120 may select a pixel rendering process, from among plural available processes or approaches, to implement to render pixels included in the second frame based on geometric information of each reference pixel. Here, rendering pixels means that geometric information of the pixels is obtained. For example, the geometric information of the intermediate pixels of the second tile 250 may be obtained by linear interpolation or ray tracing, for example. Therefore, as only examples, the selection unit 120 may select any one of linear interpolation and ray tracing as a pixel rendering process to respectively implement to render the pixels of the second frame 220.

The geometric information of each of the reference pixels, e.g., of the second tile 250, is obtained by performing ray tracing on each reference pixel. The geometric information may include a triangle ID at a node between a ray and an object, an object ID, a position of the node, a normal vector, texture coordinates, shadow bits, etc., as only examples. Hereinafter, ray tracing will be described in greater detail with reference to FIG. 3.

Figure 3:
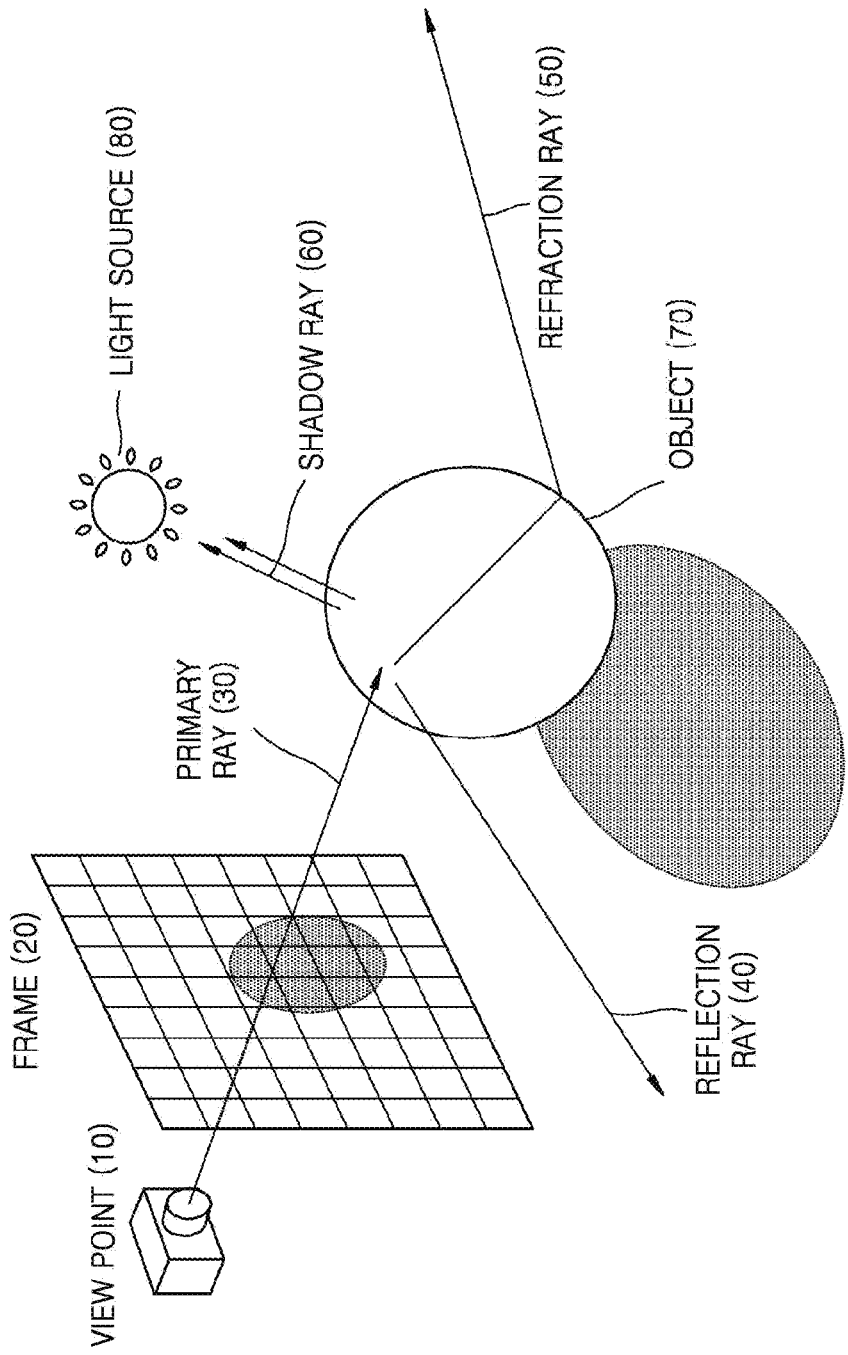
FIG. 3 illustrates an example ray tracing process, according to one or more embodiments.

FIG. 3 illustrates an example ray tracing process, according to one or more embodiments. As only a non-limiting example and for simplicity of explanation, the example ray tracing pixel rendering process of FIG. 3 will be explained through references to components of the image processing system of FIG. 4, though the same are implementable by other image processing apparatuses or systems, including the image processing apparatus 1900 of FIG. 19, as well as alternative image processing apparatuses or systems. In addition, in one or more embodiments, such image processing apparatuses and systems further include a display configure to display a rendered image using respectively obtained geometric information for reference and intermediate pixels of a frame and/or communication unit configured to output such obtained geometric information for reference and intermediate pixels for either storage or display through an external display, as only examples.

As only an example, referring to FIG. 3, when 3D modeling, a ray tracing core 200 of an image processing apparatus or system, to be described in greater detail below, may determine a view point 10 and then a frame 20 according to the view point 10. When the view point 10 and the frame 20 are determined, the ray tracing core 200 may generate rays for respective pixels included in the frame 20 from the view point 10.

A primary ray 30 is generated from the view point 10. The primary ray 30 passes the frame 20 and then intersects an object 70. A reflection ray 40 and a refraction ray 50 are generated at an intersection point where the primary ray 30 intersects the object 70. Also, a shadow ray 60 is generated in a direction toward a light source 80 from the intersection point. In this case, the reflection ray 40, the refraction ray 50, and the shadow ray 60 are referred to as secondary rays. The object 70 indicates an object to be displayed, e.g., on the display of the image processing apparatus or system, as an image and includes a plurality of primitives.

The ray tracing core 200 analyzes the primary ray 30, the secondary rays 40, 50, and 60, and rays derived from the secondary rays 40, 50, and 60. The ray tracing core 200 determines color values of pixels forming the frame 20 based on an analysis result. In this case, the ray tracing core 200 determines the color values of the pixels by taking characteristics of the object 70 into account. Resultant obtained geometric information for the pixels through the ray tracing, as well geometric information of other pixels of the frame obtained through an alternative pixel rendering process, may then be processed to form viewable image(s), that may then be displayed through the display of the image processing apparatus or system, stored in a memory of the image processing apparatus or system, or output to an external storage or display using the communication unit, as only examples.

Figure 4:
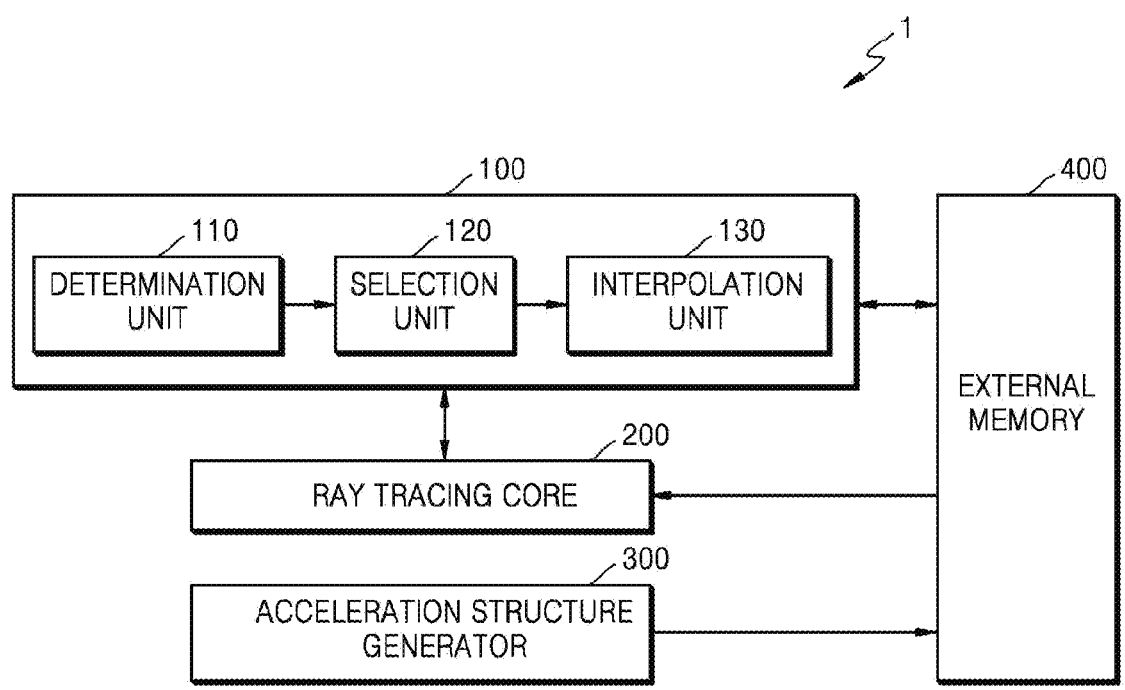
FIG. 4 illustrates an image processing system, according to one or more embodiments.

FIG. 4 illustrates an image processing system, according to one or more embodiments.

Referring to FIG. 4, the image processing system 1 may include the image processing apparatus 100, the ray tracing core 200, an acceleration structure generator 300, and an external memory 400, for example. The image processing apparatus 100 may further include an interpolation unit 130 in addition to the determination unit 110 and the selection unit 120 described with reference to FIG. 1. Still further, and as noted above, the image processing system 1 may include the aforementioned display, storage, and/or communication unit configured for respectively displaying the aforementioned viewable image(s), storing such viewable image(s), and outputting such viewable images(s). For simplicity of explanation, the above descriptions regarding the determination unit 110 and the selection unit 120 may also be applied to one or more embodiments described with reference to FIG. 4.

The image processing apparatus 100 selects a pixel rendering process, among plural available rendering processes or approaches, to implement to render pixels included in a second frame based on a rendering result of a previous first frame, e.g., based on one or more sampling rates determined for the second frame based on the rendering results of the previous first frame. In an embodiment, the first frame may be an immediately previous in-time frame, e.g., before rendering of the second frame is performed. According to an embodiment, tiles of the first frame and the second frame may be respectively rendered. The rendering result of the first frame may include geometric information of each reference pixel selected from the first frame, for example, as well as similarity and importance information for each tile included in the first frame, for example.

As noted, geometric information of pixels included in the first frame may be obtained by linear interpolation or ray tracing. In detail, when rendering the first frame, the interpolation unit 130 may obtain geometric information of intermediate pixels of the first frame by linearly interpolating the geometric information of the reference pixels of the first frame. Also, when rendering the second frame, the interpolation unit 130 may obtain geometric information of intermediate pixels of the second frame by linearly interpolating geometric information of reference pixels of the second frame. An example in which the interpolation unit 130 performs the linear interpolation will be described in greater detail below with reference to FIG. 12.

When rendering the first frame, the ray tracing core 200 may obtain geometric information of pixels by performing ray tracing on the reference pixels of the first frame and corresponding intermediate pixels. Also, when rendering the second frame, the ray tracing core 200 may obtain geometric information of pixels by performing ray tracing on the reference pixels of the second frame and corresponding intermediate pixels.

In detail, the ray tracing core 200 traces generated rays and intersection points of objects disposed at a 3D space and determines color values of pixels forming a screen. In other words, the ray tracing core 200 finds rays and intersection points of objects, generates secondary rays according to characteristics of the objects at the intersection points, and determines color values of the intersection points. Hereinafter, an embodiment in which a ray generating unit, a traversal (TRV) unit, an intersection (IST) unit, and a shading unit included in the ray tracing core 200 operate will be described.

The ray generating unit generates primary and secondary rays. The ray generating unit generates the primary ray from a view point and generates the secondary ray such as a reflection ray, a refraction ray, or a shadow ray at an intersection point between the primary ray and an object. Also, the ray generating unit may generate another secondary ray at an intersection point between the secondary ray and the object. The ray generating unit may generate a reflection ray, a refraction ray, or a shadow ray within a predetermined number of times or may determine the number of times that a reflection ray, a refraction ray, and a shadow ray are generated, according to characteristics of the object.

The TRV unit receives information about generated rays from the ray generating unit. The generated rays include a primary ray, a secondary ray, and a ray derived from the secondary ray. For example, with regard to the primary ray, the TRV unit may receive information about a view point and direction of the generated rays. Also, with regard to the secondary ray, the TRV unit may receive information about a starting point and direction of the secondary ray. The starting point of the secondary ray indicates a point where the primary ray hits the object. The view point or starting point may be indicated as coordinates, and the direction may be indicated as vectors.

The TRV unit reads information about an acceleration structure from the external memory 400. The acceleration structure is generated by the acceleration structure generator 300, and the generated acceleration structure is stored in the external memory 400. The acceleration structure is a structure including location information of the objects in a 3D space. For example, a K-dimensional (KD) tree, bounding volume hierarchy (BVH), etc. may be applied to the acceleration structure.

The TRV unit searches for the acceleration structure and outputs an object to which a ray is hit, or a leaf node. For example, the TRV unit searches for nodes included in the acceleration structure and outputs a leaf node hit by a ray from among leaf nodes that are at the lowest level among nodes, as an IST unit. In other words, the TRV unit determines which one of bounding boxes forming the acceleration structure and which one of objects included in the bounding box are hit by the ray. Information about the hit object is stored in cache of the TRV. The bounding box may indicate a unit including a plurality of objects or primitives and may vary depending on an acceleration structure. The TRV cache is a memory configured to temporarily store data used when the TRV unit searches for the acceleration structure.

The IST unit receives an object hit by a ray or a leaf node and reads, from the external memory 400, information about primitives included in the hit object. The read information about the primitives may be stored in a cache of the IST. This IST cache may be a memory configured to temporarily store data used by the IST unit during cross-retrieval.

The IST unit performs cross-retrieval between rays and primitives and outputs a primitive hit by a ray and an intersection point. The IST unit receives, from the TRV unit, an indication of which object is hit by the ray and examines which one of primitives included in the hit object is hit by the ray. After the primitive hit by the ray is found, the IST unit outputs an intersection point indicating which point of the hit primitive intersects the ray. The intersection point may be output to the shading unit of the ray tracing core 200 as coordinates.

The shading unit determines color values of pixels based on information about the intersection point received from the IST unit and material characteristics of the intersection point. The shading unit determines color values of the pixels by taking a basic color of a material of the intersection point, effects caused by a light source, etc., into account.

The ray tracing core 200 receives data used to perform ray tracing from the external memory 400. An acceleration structure generated by the acceleration structure generator 300 or geometric information indicating information about primitives is stored in the external memory 400. The primitive may be shaped as a polygon, for example, a triangle or a rectangle, and the geometric information may include a triangle ID at an intersection point of a ray and an object, an object ID, a position of an intersection point, a normal vector, texture coordinates, shadow bits, or the like, as only examples. Also, information indicating similarity and importance of each tile included in the particular frame is stored in the external memory 400.

The acceleration structure generator 300 generates an acceleration structure including position information of objects in a 3D space. The acceleration structure generator 300 may generate various types of acceleration structures. For example, the acceleration structure may be a type in which a 3D space is divided into a hierarchical tree, and the acceleration structure generator 300 may generate a structure indicating a relationship between objects in the 3D space by using a BVH or KD-tree. The acceleration structure generator 300 may determine the maximum number of primitives of a leaf node and a tree depth and may generate an acceleration structure based on the determined number of primitives and tree depth.

An example in which a pixel rendering process implemented to render pixels included in the second frame is selected by the image processing apparatus 100, for example, based on a rendering result of the first frame, will now be described with reference to FIG. 5.

Figure 5:
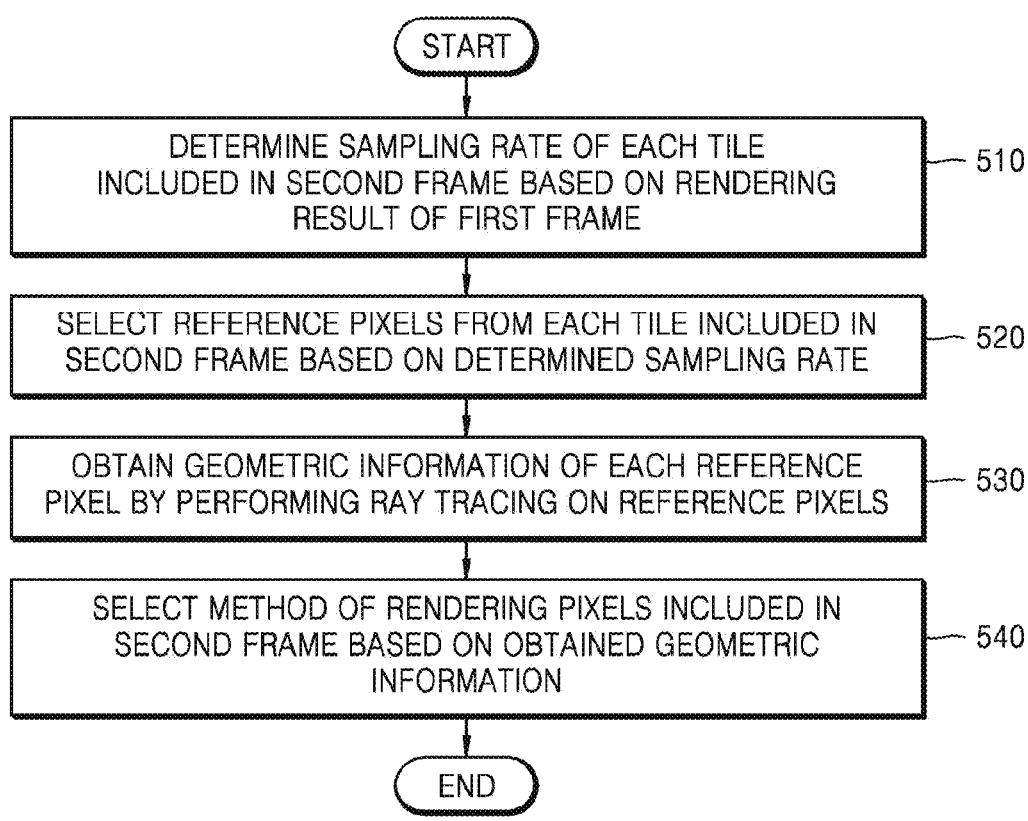
FIG. 5 illustrates a flowchart for an image processing method, according to one or more embodiments.

FIG. 5 illustrates a flowchart for an image processing method, according to one or more embodiments. Below, as only a non-limiting example and for simplicity of explanation, the image processing method of FIG. 5 will be explained through references to components of the image processing system of FIG. 4. The image processing method of FIG. 5 is implementable by other image processing apparatuses or systems, including the image processing apparatus 1900 of FIG. 19, as well as alternative image processing apparatuses or systems.

In operation 510, the determination unit 110 determines respective sampling rates for each tile included in the second frame based on rendering results of the first frame. For example, the determination unit 110 may determine the sampling rate of each tile included in the second frame according to a determined similarity and/or importance of each tile included in the first frame. Therefore, in an embodiment, the first frame may be rendered before the sampling rates of the tiles included in the second frame are determined, and while the first frame is rendered, such rendering and geometric information of the tiles included in the first frame are obtained. An example in which the first frame is rendered and the similarity of the tiles included in the first frame is obtained will be described below with regard to FIGS. 6-12.

Briefly, in operation 520, reference pixels from each tile included in the second frame may then be selected based on the respective sampling rates determined for the second frame in operation 510. Geometric information for each of the selected reference pixels may accordingly be obtained by performing ray tracing on the selected reference pixels of the second frame, in operation 530, and respective pixel rendering processes may be selected for rendering the remaining intermediate pixels of the second frame, in operation 540. Operations 520-540 will be discussed further below after discussions regarding FIGS. 6-12.

Figure 6:
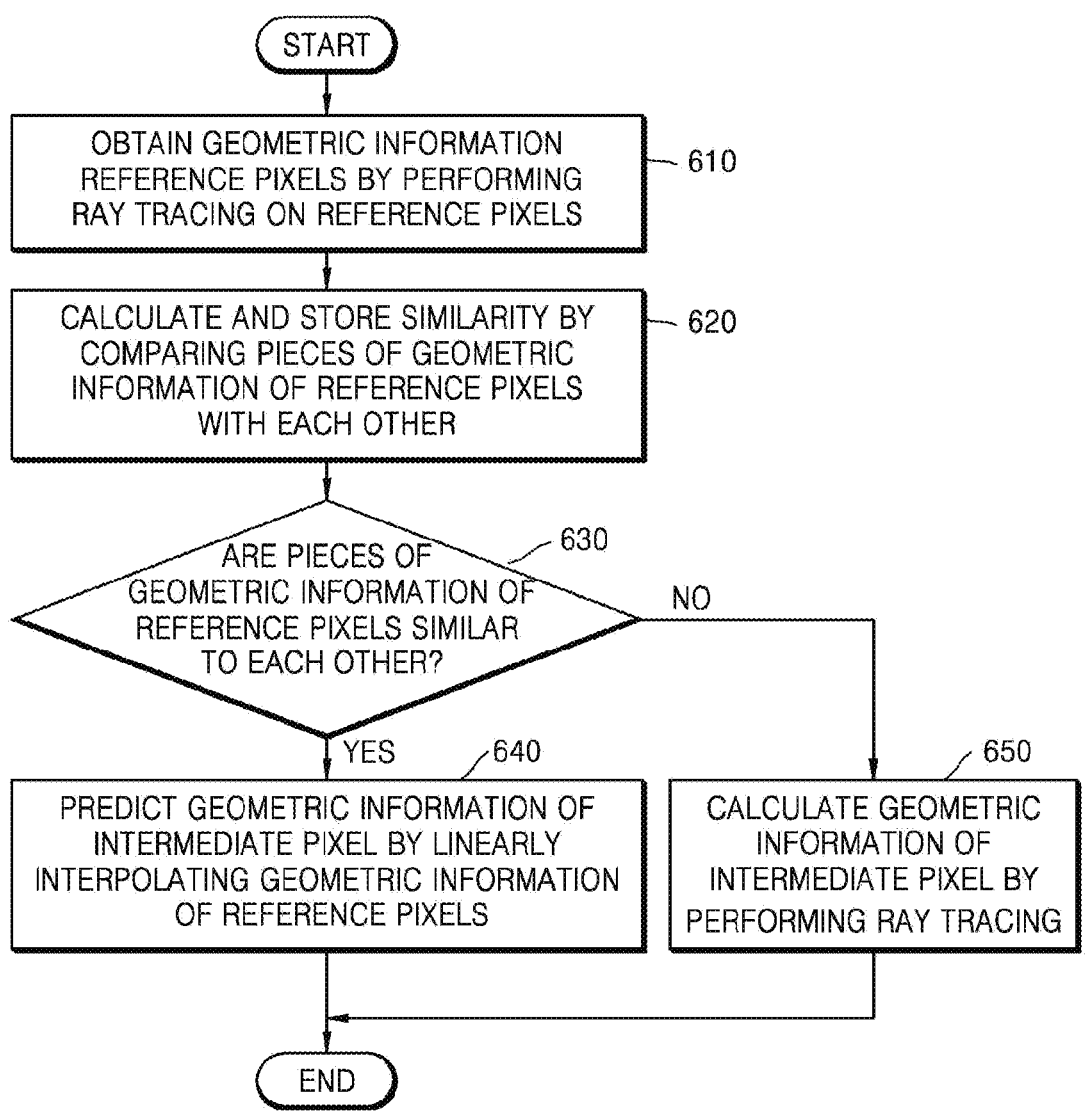
FIG. 6 illustrates an image processing method where a first frame is rendered and respective similarities of tiles included in the first frame are obtained, according to one or more embodiments.

FIG. 6 illustrates an image processing method where a first frame is rendered and respective similarities of each of the tiles included in the first frame are obtained, according to one or more embodiments. Below, as only a non-limiting example and for simplicity of explanation, the image processing method of FIG. 6 will be explained through references to components of the image processing system of FIG. 4. The image processing method of FIG. 6 is implementable by other image processing apparatuses or systems, including the image processing apparatus 1900 of FIG. 19, as well as alternative image processing apparatuses or systems.

FIG. 6 illustrates that a first tile included in the first frame is rendered and similarity of the first tile in the first frame is obtained. Briefly, herein references to a first or second tile are merely numerical references for convenience to differentiate between different tiles and are not intended to refer to a sequence of particular tiles, particular ordering of tiles, or a particular tile of any particular frame. In addition, if the first frame includes a plurality of tiles, each of the tiles of the first frame, other than the first tile, will also be rendered as described below, and similarity of each of the tiles obtained.

In operation 610, the ray tracing core 200 obtains the geometric information of reference pixels by performing ray tracing. For example, the ray tracing core 200 may obtain a triangle ID, an object ID, a position of an intersection point, a normal vector, texture coordinates, a shadow bit, etc., as only examples, of the reference pixels.

For example, before operation 610 is performed, the image processing apparatus 100 divides the first tile into pixel blocks based on a predetermined sampling rate, e.g., based on rendering results of a previous frame, and may select one pixel as a reference pixel from each pixel block.

In operation 620, the image processing apparatus 100 calculates the similarity of the first tile of the first frame by comparing pieces of geometric information of the reference pixels of the first tile with each other. The image processing apparatus 100 stores the similarity of the first tile in the external memory 400. In detail, the selection unit 120 may calculate or anticipate the similarity of the reference pixels of the first tile with the corresponding intermediate pixels of the first tile, adjacent to the reference pixels, by using the geometric information of the reference pixels. That is, the selection unit 120 conducts a similarity test. The selection unit 120 may determine the similarity of the first tile of the first frame based on a result of the similarity test.

In operation 630, the selection unit 120 determines whether pieces of the geometric information of the reference pixels are similar to each other, and if yes, geometric information of intermediate pixels may be predicted by linearly interpolating geometric information of corresponding reference pixels, in operation 640, or if no, geometric information for the intermediate pixels may be calculated through ray tracing, in operation 650. Operations 630-650 will be discussed in greater detail below after discussions regarding FIGS. 7-11.

Hereinafter, an example in which the selection unit 120 conducts the similarity test will be described below with reference to FIGS. 7 to 10. Again, below, as only a non-limiting example and for simplicity of explanation, the example similarity test implementations of FIGS. 7-11 will be explained through references to components of the image processing system of FIG. 4, though the same are implementable by other image processing apparatuses or systems, including the image processing apparatus 1900 of FIG. 19, as well as alternative image processing apparatuses or systems.

Figure 7:
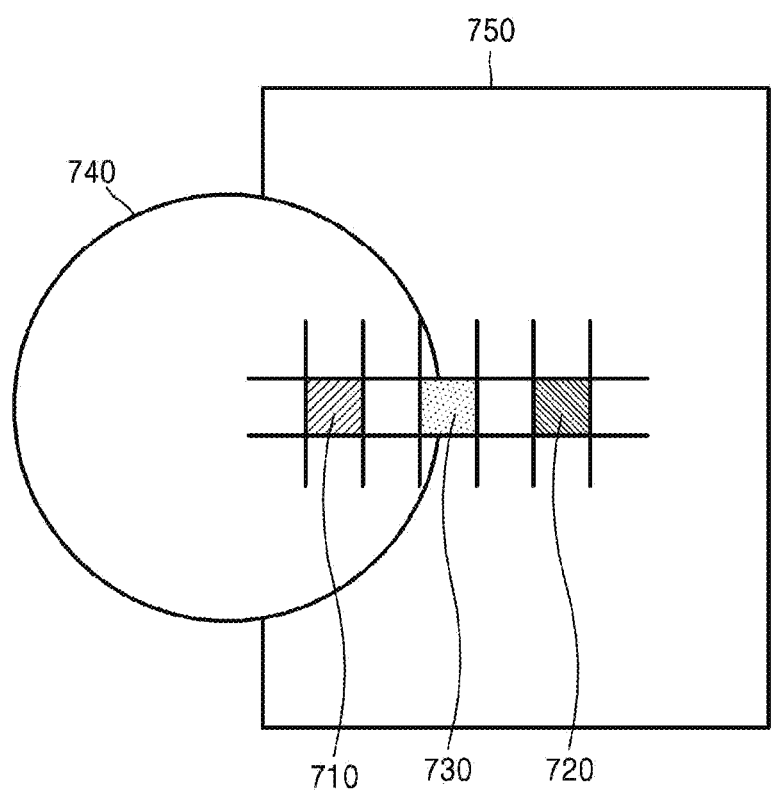
FIG. 7 illustrates an implementation of a similarity test in an image processing method, according to one or more embodiments.

FIG. 7 illustrates an implementation of a similarity test in an image processing method, according to one or more embodiments.

FIG. 7 illustrates that the selection unit 120 conducts the similarity test based on an object ID. In FIG. 7, it is assumed that an object ID of a first reference pixel 710 is an ID of an object 740, and an object ID of a second reference pixel 720 is an ID of an object 750. Therefore, the object ID of the first reference pixel 710 is different from the object ID of the second reference pixel 720.

In this case, which one of the objects 740 and 750 corresponds to an intermediate pixel 730 may not be predicted in advance. Therefore, the selection unit 120 may at least determine that geometric information of the first reference pixel 710 is not similar to geometric information of the second reference pixel 720.

Figure 8:
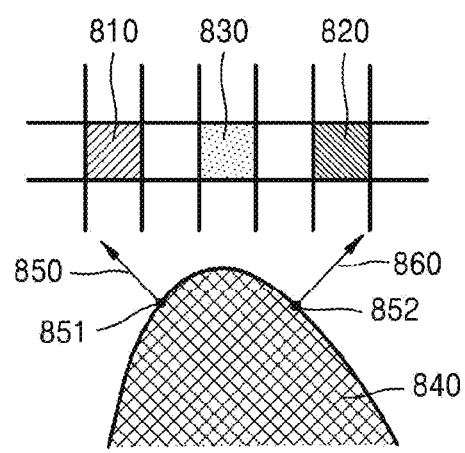
FIG. 8 illustrates an implementation of a similarity test in an image processing method, according to one or more embodiments.

FIG. 8 illustrates an implementation of a similarity test in an image processing method, according to one or more embodiments.

FIG. 8 illustrates that the selection unit 120 conducts a similarity test by comparing normal vectors for a first reference pixel 810 and a second reference pixel 820. The selection unit 120 calculates an inner product of a first normal vector 850 at a portion 851 of an object 840 that corresponds to the first reference pixel 810 and the second normal vector 860 at a portion 852 of the object 840 that corresponds to a second reference pixel 820. As only an example, pixel 830 may be an intermediate pixel corresponding to either of the first reference pixel 810 or second reference pixel 820.

As illustrated in FIG. 8, when a direction of the first normal vector 850 is greatly different from a direction of the second normal vector 860, the calculated inner product is equal to 0 or close to a negative number. Also, as fluctuation increases in the object 840, the first normal vector 850 may become different from the second normal vector 860.

Therefore, in this example, only when the calculated inner product meets, or is greater than, a threshold value, does the selection unit 120 determine that the geometric information of the first reference pixel 810 is similar to the geometric information of the second reference pixel 820. If the calculated inner produce does not meet, or is equal to or less than the threshold value, the selection unit 120 determines that the geometric information of the first reference pixel 810 is not similar to the geometric information of the second reference pixel 820.

Figure 9:
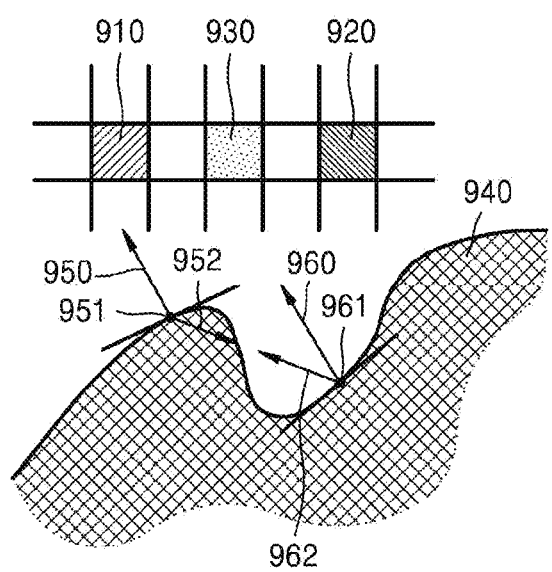
FIG. 9 illustrates an implementation of a similarity test in an image processing method, according to one or more embodiments.

FIG. 9 illustrates an implementation of a similarity test in an image processing method, according to one or more embodiments.

FIG. 9 illustrates that the selection unit 120 conducts a similarity test by comparing normal vectors included in geometric information and position information with each other. As illustrated in FIG. 9, when surface fluctuation exists in one object 940, geometric information of a first reference pixel 910 is greatly different from that of a second reference pixel 920, in general. However, directions of the normal vectors may be similar to each other by chance. Briefly, as only an example, pixel 930 may be an intermediate pixel corresponding to either of the first reference pixel 910 or second reference pixel 920.

Therefore, the selection unit 120 calculates a first direction vector 952 from a position 951 toward a position 961 and a second direction vector 962 from the position 961 to the position 951. The selection unit 120 multiplies an inner product of a normal vector 950 and the first direction vector 952 which are included in the geometric information of the first reference pixel 910 and an inner product of a normal vector 960 and the second direction vector 962 which are included in the geometric information of the second reference pixel 920 together.

When a multiplication result meets, of is greater than, a threshold value, the selection unit 120 determines that the geometric information of the first reference pixel 910 is similar to the geometric information of the second reference pixel 920. Otherwise, when the multiplication result does not meet, or is equal to or less than, the threshold value, the selection unit 120 determines that the geometric information of the first reference pixel 910 is not similar to the geometric information of the second reference pixel 920.

The selection unit 120 compares a shadow bit (i.e., a bit indicating whether a region is a shadow region) included in the geometric information of the first reference pixel 910 with a shadow bit included in the geometric information of the second reference pixel 920, and when the shadow bit included in the geometric information of the first reference pixel 910 is not the same as the shadow bit included in the geometric information of the second reference pixel 920, the selection unit 120 may also determine that the geometric information of the first reference pixel 910 is not similar to the geometric information of the second reference pixel 920.

Figure 10:
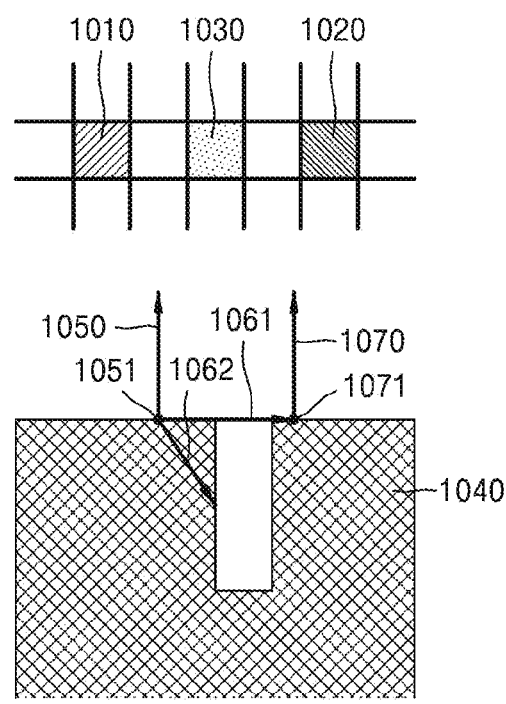
FIG. 10 illustrates an implementation of a similarity test in an image processing method, according to one or more embodiments.

FIG. 10 illustrates an implementation of a similarity test in an image processing method, according to one or more embodiments.

FIG. 10 illustrates that the selection unit 120 conducts a similarity test by using a secondary ray. Although respective paths of primary rays may be the same while ray tracing is performed, paths of respective secondary rays may be different from each other in accordance with a direction in which the primary rays are reflected or refract. In this case, it may be difficult to indirectly calculate geometric information of an intermediate pixel 1030 by using geometric information of a first reference pixel 1010 and geometric information of a second reference pixel 1020, which means that linear interpolation may be performed for the intermediate pixel 1030.

Therefore, the selection unit 120 may calculate an inner product of a direction vector 1061 and a direction vector 1062. The direction vector 1061 is a vector from a position 1051 of a portion of an object 1040 which corresponds to the first reference pixel 1010 to a position 1071 of a portion of the object 1040 which corresponds to the second reference pixel 1020, and the direction vector 1062 is a vector of a secondary ray corresponding to the first reference pixel 1010.

Only when the calculated inner product meets, or is greater than, a predetermined threshold value, does the selection unit 120 determine that the geometric information of the first reference pixel 1010 is similar to the geometric information of the second reference pixel 1020. When the calculated inner product does not meet, or is equal to or less than the predetermined threshold value, the selection unit 120 determines that the geometric information of the first reference pixel 1010 is not similar to the geometric information of the second reference pixel 1020. Normal vectors 1050 and 1070 may be used in the similarity test as described above regarding FIGS. 7 to 9.

Figure 11:
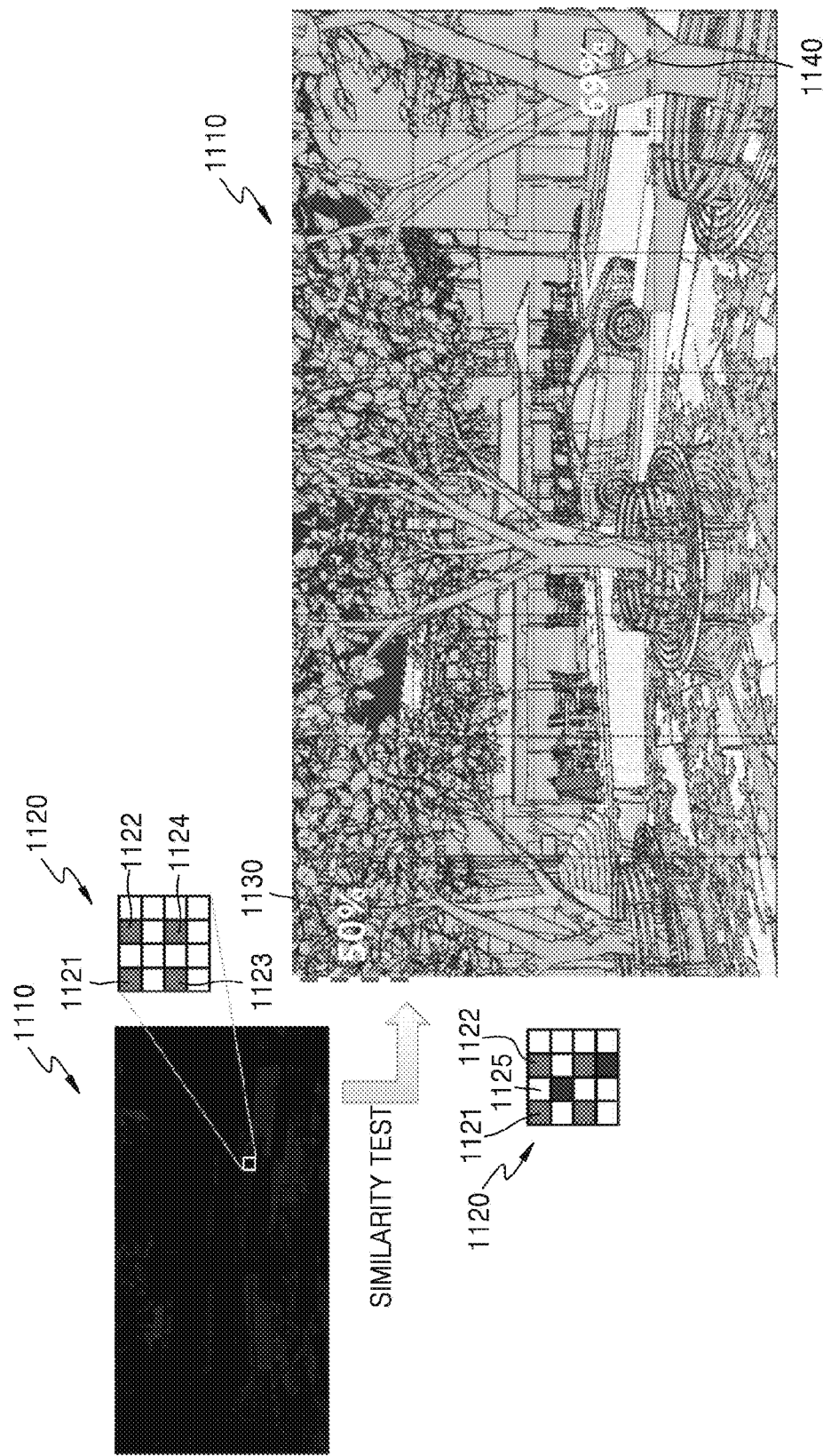
FIG. 11 illustrates a result of a similarity test, according to one or more embodiments.

FIG. 11 illustrates a result of a similarity test according to one or more embodiments.

As described with reference to FIGS. 7 to 10, the selection unit 120 may conduct a similarity test by using geometric information of reference pixels, such as the illustrated first, second, third, and fourth reference pixels 1121, 1122, 1123, and 1124 selected from an example first tile 1120. In other words, the selection unit 120 may calculate similarity between the first, second, third, and fourth reference pixels 1121, 1122, 1123, and 1124 and an intermediate pixel. As illustrated, each of the first, second, third, and fourth reference pixels 1121, 1122, 1123, and 1124 of the first tile 1120 may be of different 2×2 pixel blocks, e.g., each reference pixel being an example upper left pixel of each pixel block of the first tile 1120. The intermediate pixel may be any of the remaining non-reference pixels of the first tile 1120.

With completion of the similarity test, the similarity of the first tile 1120 may be determined. For example, when geometric information of the first reference pixel 1121 is determined to be similar to geometric information of the second reference pixel 1122, the selection unit 120 may determine that first intermediate pixel 1125 is similar to each of the first and second reference pixels 1121 and 1122, and determine that the first intermediate pixel 1125 is not similar to each of the first and second reference pixels 1121 and 1122 when geometric information of the first and second reference pixels 1121 and 1122 are different. The selection unit 120 may determine whether all intermediate pixels included in the first tile 1120 are similar or not similar to each other through similar comparisons. Alternatively, if the first and second reference pixels 1121 and 1122 are determined to be similar then all intermediate pixels included in the first tile 1120 may be determined to also be similar. In these two examples, the similarity determination is respectively based on more and less reference pixel comparisons. Accordingly, based on comparisons of the reference pixels, similarities between the intermediate pixels may also be determined.

As only an example, the similarity of the first tile 1120 may be presented as a number, e.g., by contrasting the number of intermediate pixels that are determined to be similar to each other by the selection unit 120 with the number of intermediate pixels that are determined to be different from each other by the selection unit 120. Alternative ways of representing the determined similarities or differences are equally available, such contrasting the number of intermediate pixels that are determined to be similar to their neighboring reference pixels with the number of intermediate pixels that are determined to be different from their neighboring reference pixel. The similarity may also be based on a number of reference pixels that are determined to be similar. Regardless, as an example, the selection unit 120 may present that the similarity of another example tile 1130 included in the first frame 1110 is 50% while the similarity of still another example tile 1140 in the first frame 1110 is 69%. As only an example, as discussed above, this similarity information may be useful when rendering a next frame, e.g., to determine a sampling rate for the next frame, or to determine respective sampling rates for the corresponding tiles of the next frame.

Referring back to FIG. 6, in operation 630, when the first frame 1110 is being rendered, the selection unit 120 determines whether pieces of the geometric information of the reference pixels are similar to each other. Examples, in which the selection unit 120 determines whether the pieces of the geometric information of the reference pixels are similar to each other, are the same as described with reference to FIGS. 7 to 10.

If it is determined that the pieces of the geometric information of the reference pixels are similar to each other, operation 640 is performed. Otherwise, if it is determined that the pieces of the geometric information of the reference pixels are not similar to each other, operation 650 is performed.

In operation 640, the interpolation unit 130 predicts geometric information of an intermediate pixel by linearly interpolating the geometric information of the reference pixels. Since it is determined that the pieces of the geometric information of the reference pixels are similar to each other in operation 630, the selection unit 120 may determine that the pixel rendering process that will be used to render the intermediate pixel is a linear interpolation pixel rendering process. Therefore, the interpolation unit 130 may predict the geometric information of the intermediate pixel by linearly interpolating the geometric information of the reference pixels. Hereinafter, an example in which the interpolation unit 130 predicts the geometric information of the intermediate pixel will be described with reference to FIG. 12. Briefly, though the above discussions regarding the determining of which pixel rendering process to implement to render an intermediate pixel, for example, of the first frame is discussed, the same process is similarly available for the discussed second subsequent frame, where a pixel rendering process may be determined for respective intermediate pixels of tiles of the second frame, e.g., based on the determined sampling rate for the second frame.

Figure 12:
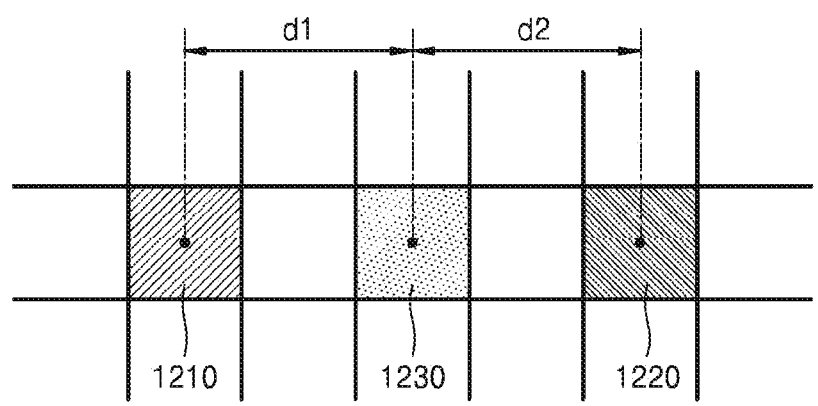
FIG. 12 illustrates an implementation of a predicting of geometric information of an intermediate pixel in an image processing method, according to one or more embodiments.

FIG. 12 illustrates an implementation of a predicting of geometric information of an intermediate pixel in an image processing method, such as predicted by the interpolation unit 130 of FIG. 1, according to one or more embodiments. Below, as only a non-limiting example and for simplicity of explanation, the example geometric information prediction implementation of FIG. 12 will be explained through references to components of the image processing system of FIG. 4, though the same are implementable by other image processing apparatuses or systems, including the image processing apparatus 1900 of FIG. 19, as well as alternative image processing apparatuses or systems.

As described with reference to FIGS. 7 to 10, when the image processing system 1 determines that first geometric information corresponding to a first reference pixel 1210 is similar to second geometric information corresponding to a second reference pixel 1220, the interpolation unit 130 may predict intermediate geometric information corresponding to an intermediate pixel 1230 through interpolation of the first geometric information and the second geometric information.

For example, the interpolation unit 130 may perform linear interpolation according to a proportional relationship between the illustrated distance d1 and a distance d2. The distance d1 is a distance between the first reference pixel 1210 and the intermediate pixel 1230, and the distance d2 is a distance between the second reference pixel 1220 and the intermediate pixel 1230. In this case, the intermediate geometric information that is predicted through the linear interpolation may include a triangle ID, an object ID, a position of an intersection point, a normal vector, texture coordinates, a shadow bit, or the like, as only examples.

As described above, since the interpolation unit 130 may predict geometric information of the intermediate pixel 1230 by performing linear interpolation, the ray tracing core 200 does not have to perform ray tracing on all pixels included in the underlying tile. Therefore, time and costs (e.g., power) that the image processing system 1 according to one or more embodiments requires to process an image may be reduced compared to an image processing system that always performs ray tracing on all pixels in the tiles of a frame.

Referring back to FIG. 6, in operation 650, when pieces of geometric information of reference pixels are determined to not be similar to each other in operation 630, the ray tracing core 200 may calculate the geometric information of the intermediate pixel by performing ray tracing. Therefore, in this case, the ray tracing core 200 may select to calculate the geometric information of the intermediate pixel by performing the ray tracing. An example in which the ray tracing core 200 performs the ray tracing may be the same as described with reference to FIG. 4 and therefore is not repeated here.

Referring back to FIG. 5, in operation 510, for rendering the second frame, the determination unit 110 may determine the respective sampling rates for each tile included in the second frame. As described above with reference to FIGS. 6 to 12, the image processing system 1 may render the first frame and obtain the similarity of the tiles included in the first frame. Accordingly, the determination unit 110 may determine a respective sampling rate of each tile included in the second frame based on the respective similarity of the tiles included in the first frame.

For example, the determination unit 110 may increase, maintain, or decrease the sampling rate for a corresponding tile of the second frame, e.g., compared to the sampling rate of the corresponding tile of the first frame, so that the sampling rate of the second tile is greater, equal, or less than the sampling rate that was used in the rendering of the corresponding tile of the first frame.

In operation 520, the determination unit 110 may select one or more reference pixels from each tile included in the second frame, e.g., based on each tile's respectively determined sampling rate. For example, when it is assumed that the sampling rate of the corresponding tile of the second frame is 3*3, the determination unit 110 divides the corresponding tile of the second frame into pixel blocks of 3*3 pixels and may select a reference pixel from each pixel block.

In operation 530, the selection unit 120 obtains geometric information of each reference pixel selected in operation 520 by performing ray tracing on each reference pixel of the corresponding tile of the second frame.

In operation 540, the selection unit 120 selects respective pixel rendering processes to implement for rendering each of the pixels included in the second frame based on the geometric information of the reference pixels of the second frame.

Depending on the respective pixel rendering processes selected by the selection unit 120, the interpolation unit 130 may predict the geometric information of an intermediate pixel by linearly interpolating the geometric information of the neighboring or nearby reference pixels, or the ray tracing core 200 may calculate the geometric information of the intermediate pixel by performing ray tracing of that intermediate pixel.

Hereinafter, operations of FIG. 5 will be similarly described with reference to FIG. 13.

Figure 13:
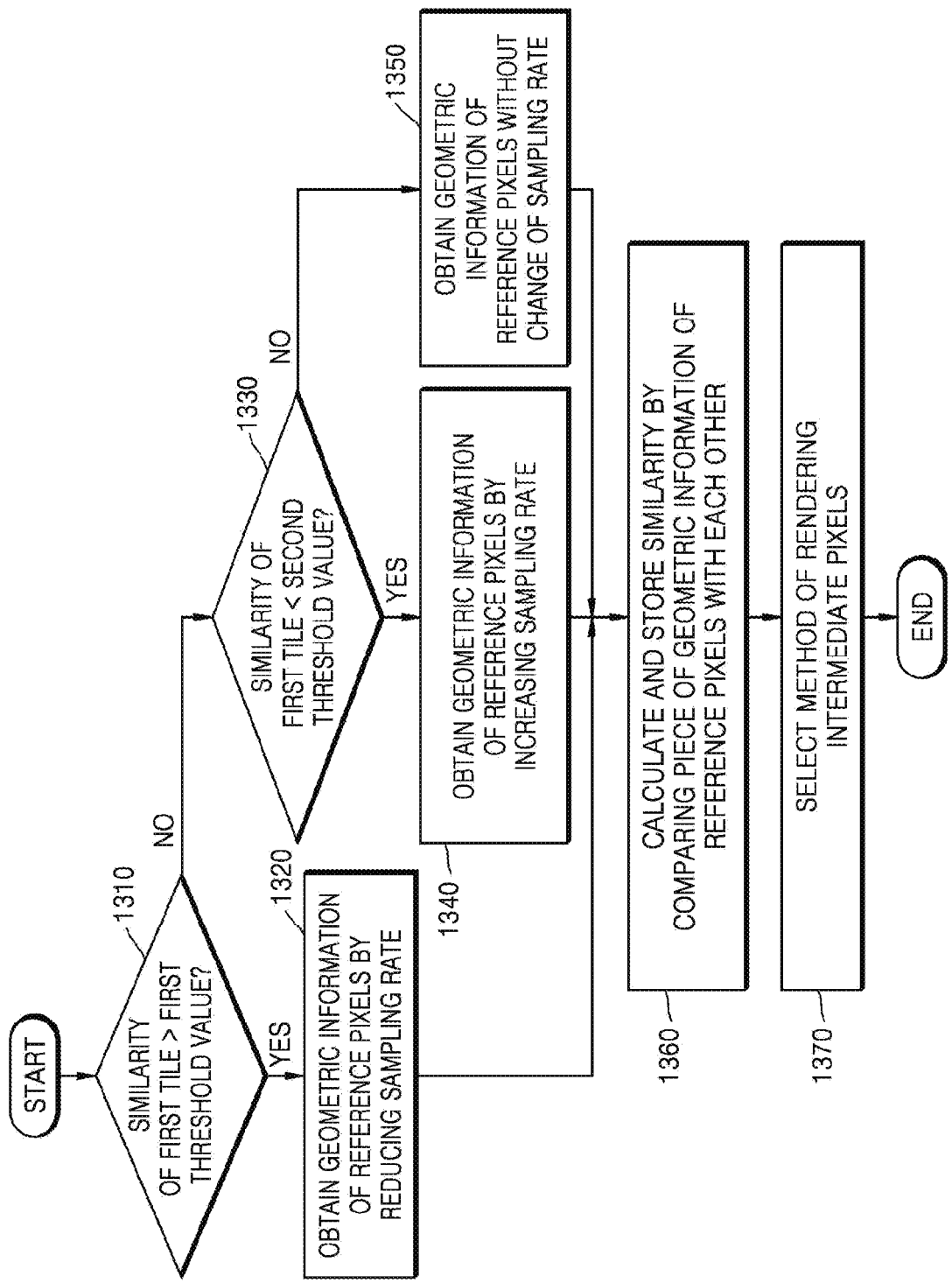
FIG. 13 illustrates a flowchart for an image processing method, according to one or more embodiments.

FIG. 13 illustrates a flowchart for an image processing method, according to one or more embodiments.

Referring to FIG. 13, as an example it will be assumed that the image processing system 1 completes rendering of a previous first frame, such as the aforementioned operations of the processing system 1 rendering the first frame with reference to FIGS. 5 to 12. Briefly, as only a non-limiting example and for simplicity of explanation, the example operations of FIG. 13 will be explained through references to components of the image processing system of FIG. 4, though the same are implementable by other image processing apparatuses or systems, including the image processing apparatus 1900 of FIG. 19, as well as alternative image processing apparatuses or systems. Accordingly, in this example, a first threshold value and a second threshold value may be set when the image processing apparatus 100 is manufactured or may be changed by a user after the image processing apparatus 100 is manufactured.

In operation 1310, the determination unit 110 determines whether the similarity of a first tile, e.g., of the first frame, meets or exceeds the first threshold value. If the similarity of the first tile meets or exceeds the first threshold value, operation 1320 is performed. Otherwise, if the similarity of the first tile does not meet or exceed the first threshold value, operation 1330 is performed.

In operation 1320, the determination unit 110 decreases a sampling rate to be applied to a second tile, e.g., of a current subsequent frame being rendered, decreasing the sampling rate that was applied to the corresponding first tile. Using the decreased sampling rate, the determination unit 10 divides the second tile into a plurality of pixel blocks and selects a reference pixel from each pixel block.

The similarity of the first tile exceeding the first threshold value means that pixels included in the first tile are determined to be similar to each other. Herein, the first tile corresponding to the second tile means that the second tile includes or represents information or object(s) similar to that of the first tile, and thus, it may be predicted that pixels included in the second tile may be more likely to be similar to the pixels included in the first tile. Therefore, with the similarity of the first tile meeting or exceeding the first threshold, the determination unit 110 may decrease the sampling rate to be applied to the second tile, compared to the sampling rate applied to the first tile.

For example, when it is assumed that the sampling rate applied to the first tile results in 2*2 pixel blocks, the selection unit 120 may adjust the sampling rate for the rendering of the second tile to result in 3*3 pixel blocks, 4*4 pixel blocks, etc. Here, in this example, the number of pixels included in the first tile is the same as the number of pixels included in the second tile, which means that there will be fewer pixel blocks in the second tile when the sampling rate is reduced. Accordingly, the number of reference pixels selected by the determination unit 110 from the second tile, according to the adjusted sampling rate, may be smaller than the number of reference pixels selected from the first tile because there are fewer pixel blocks from which to select reference pixels from.

The selection unit 120 obtains geometric information of the reference pixels selected from the second tile. In detail, the ray tracing core 200 calculates the geometric information of the reference pixels selected from the second tile, and the selection unit 120 obtains the calculated geometric information from the ray tracing core 200.

In operation 1330, the determination unit 110 determines whether the similarity of the first tile fails to meet, or is lower than, the second threshold value. If the similarity of the first tile fails to meet or is lower than the second threshold value, operation 1340 is performed. Otherwise, if the similarity of the first tile meets or is not lower than the second threshold value, operation 1350 is performed. In this case, the second threshold value is less than the first threshold value.

In operation 1340, the determination unit 110 increases the sampling rate to be applied to the second tile. The determination unit 110 divides the second tile into a plurality of pixel blocks according to the increased sampling rate and selects a reference pixel from each pixel block.

The similarity of the first tile that failing to meet, or being lower than, the second threshold value means that there are a number of different pixels among the pixels included in the first tile. Therefore, the determination unit 110 may increase the sampling rate to be applied to render the second tile, in comparison with the sampling rate that was used to render the first tile.

For example, in operation 1340, when it is assumed that the sampling rate that was used to render the first tile resulted in 3*3 pixel blocks, the selection unit 120 may adjust the sampling rate to be applied to the second tile to result in 2*2 pixel blocks, etc. Thus, the number of reference pixels that may be selected by the determination unit 110 from the second tile, according to the adjusted sampling rate, may be greater than the number of reference pixels selected from the first tile for the rendering of the first tile.

The selection unit 120 obtains geometric information of the reference pixels selected from the second tile.

In operation 1350, based on the result of operation 1330, the determination unit 110 divides the second tile into pixel blocks without changing the sampling rate and selects a reference pixel from each pixel block. In other words, the determination unit 110 divides the second tile into pixel blocks using the same sampling rate that was used to render the first tile. Therefore, the number of reference pixels selected by the determination unit 110 from the second tile may be the same as the number of reference pixels selected from the first tile for the rendering of the first tile.

The selection unit 120 obtains the geometric information of the reference pixels selected from the second tile.

In operation 1360, the selection unit 120 calculates the similarity of the second tile by comparing pieces of geometric information of the reference pixels with each other. The selection unit 120 stores the calculated similarity in the external memory 400. A more detailed explanation of such a calculating of the similarity of the second tile, e.g., by the selection unit 120, is described above with reference to FIGS. 6 to 11.

In operation 1370, the selection unit 120 selects a pixel rendering process to implement to render intermediate pixels included in the second tile. For example, the selection unit 120 may select any one of a linear interpolation pixel rendering process and ray tracing pixel rendering process, as non-limiting examples. A detailed method of selecting such a pixel rendering process to implement to render such intermediate pixels, e.g., by the selection unit 120 of FIG. 1, is described above with reference to FIGS. 6 to 11.

Therefore, in an embodiment, according to the pixel rendering process selected by the selection unit 120, the interpolation unit 130 may predict geometric information of the intermediate pixels by linearly interpolating the geometric information of the reference pixels, or the ray tracing core 200 may calculate the geometric information of the intermediate pixels by performing ray tracing for one or more, or all, of the intermediate pixels.

As described with reference to FIGS. 6 to 13, the image processing system 1 adaptively adjusts the sampling rate of the second tile based on the similarity determined by the rendering of the first tile and may determine respective pixel rendering processes to implement to render pixels included in the second tile. Therefore, since the image processing system 1 may adaptively adjust the number of pixels that are rendered through the ray tracing, costs (e.g., time or power) spent for rendering may be decreased while the quality of an image may be maintained.

The determination unit 110 may also determine the similarity of the first tile as well as the sampling rate of the second tile based on a determined importance of the first tile. Importance information of the first tile may indicate how accurately the pixels included in the first tile have to be, or are desired to be, rendered. That is, if the importance of the first tile is high, the pixels included in the first tile may be more accurately rendered compared to another tile whose importance is less. Also, while the first frame may be similar to the second frame, the determination unit 110 may still determine to make the sampling rate of the second tile greater than the sampling rate of the first frame when the importance of the first tile is high. Hereinafter, an example importance of tiles will be described with reference to FIGS. 14A and 14B.

Figure 14A:
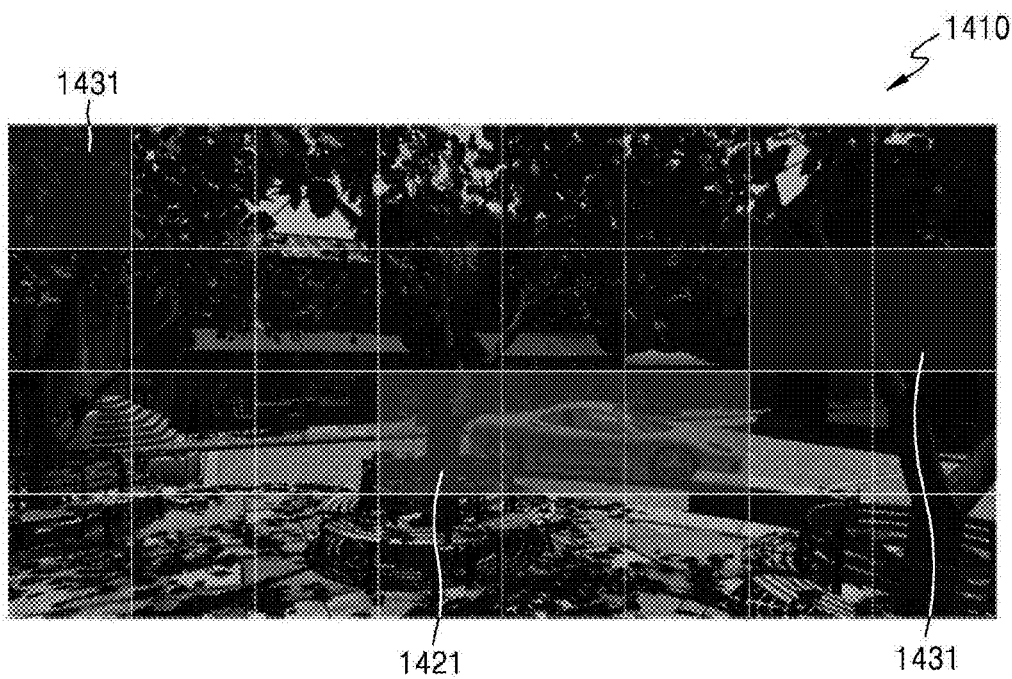
FIGS. 14A and 14B illustrate images demonstrating differences in the importance of tiles, according to one or more embodiments.
Figure 14B:
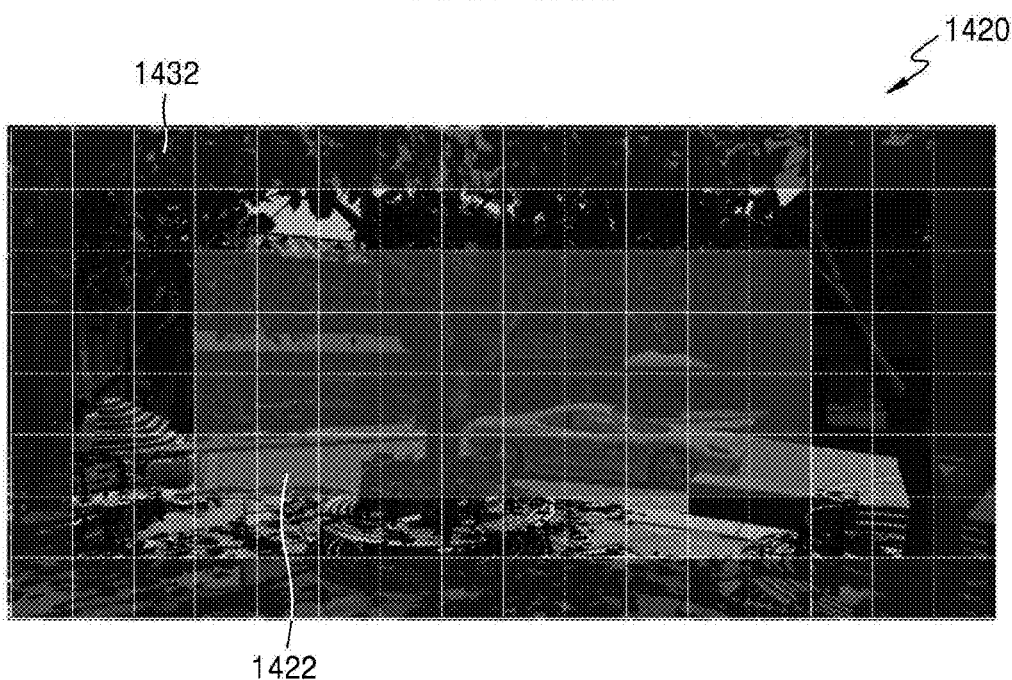

FIGS. 14A and 14B illustrate images demonstrating differences in importance of tiles, according to one or more embodiments.

As described with reference to FIGS. 6 to 13, the determination unit 110 may determine the sampling rate of a second tile, e.g., of a current frame, based on the determined similarity of a corresponding first tile, e.g., of a previous frame. In other words, if the similarity of the first tile is low, the determination unit 110 may set the sampling rate of the second tile to be greater than the sampling rate that was used to render the first tile. Therefore, when the similarity of the first tile is low, the number of reference pixels selected from the second tile may be increased to be greater than the number of reference pixels selected from the first tile for the rendering of the first tile.

However, although the similarity of the first tile may be low, if the importance of the first tile is also low, it may be more desirable for the image processing system 1 to not more accurately render the second tile. That is, when the importance of the first tile is low, the quality of an image corresponding to the second frame may not be greatly affected even if the image processing system 1 does not accurately render the second tile, so it may not be necessary to increase the sampling rate of the second tile. For example, if the first tile includes a number of shadow regions, the quality of an image may be not greatly affected even though the second tile is not accurately rendered, so the sampling rate of the second tile may not be increased.

FIGS. 14A and 14B illustrate three tiles 1421 in an example frame 1410 and several tiles 1422 in an example frame 1420 respectively having high importance, and several tiles 1431 in the example frame 1410 and several periphery tiles 1432 in the example frame 1420 respectively having low importance.

For example, referring to FIG. 14A, if a reflection ray or refraction ray is generated a lot as a result of ray tracing on reference pixels, the importance of the tiles 1421 including the above reference pixels may be determined to be high. If a shadow ray is generated a lot as a result of ray tracing on the reference pixels, the importance of the tiles 1431 including the above reference pixels may be determined to be low.

As another example, referring to FIG. 14B, the importance of the tiles 1422 disposed at a center of the example frame 1420 may be determined to be high. In general, when a user views an image, the user usually pays attention to a center of the image. Accordingly, the importance of the tiles 1422 disposed at the center of the example frame 1420 may be determined to be high, and the importance of tiles 1432 disposed on an outer portion or periphery of the example frame 1420 may be determined to be relatively low.

As another example, the tiles 1421 and 1422 having high importance may be set by the user. Also, based on information transmitted from a sensor tracing the eyes of the user, tiles corresponding to regions of the example frame 1410 and/or example frame 1420 where the user pays a lot of attention may be determined as the respective tiles 1421 and 1422 having high importance.

Hereinafter, an example, in which a first frame is rendered and the similarity and importance of tiles included in the first frame are obtained, will be described with reference to FIG. 15.

Figure 15:
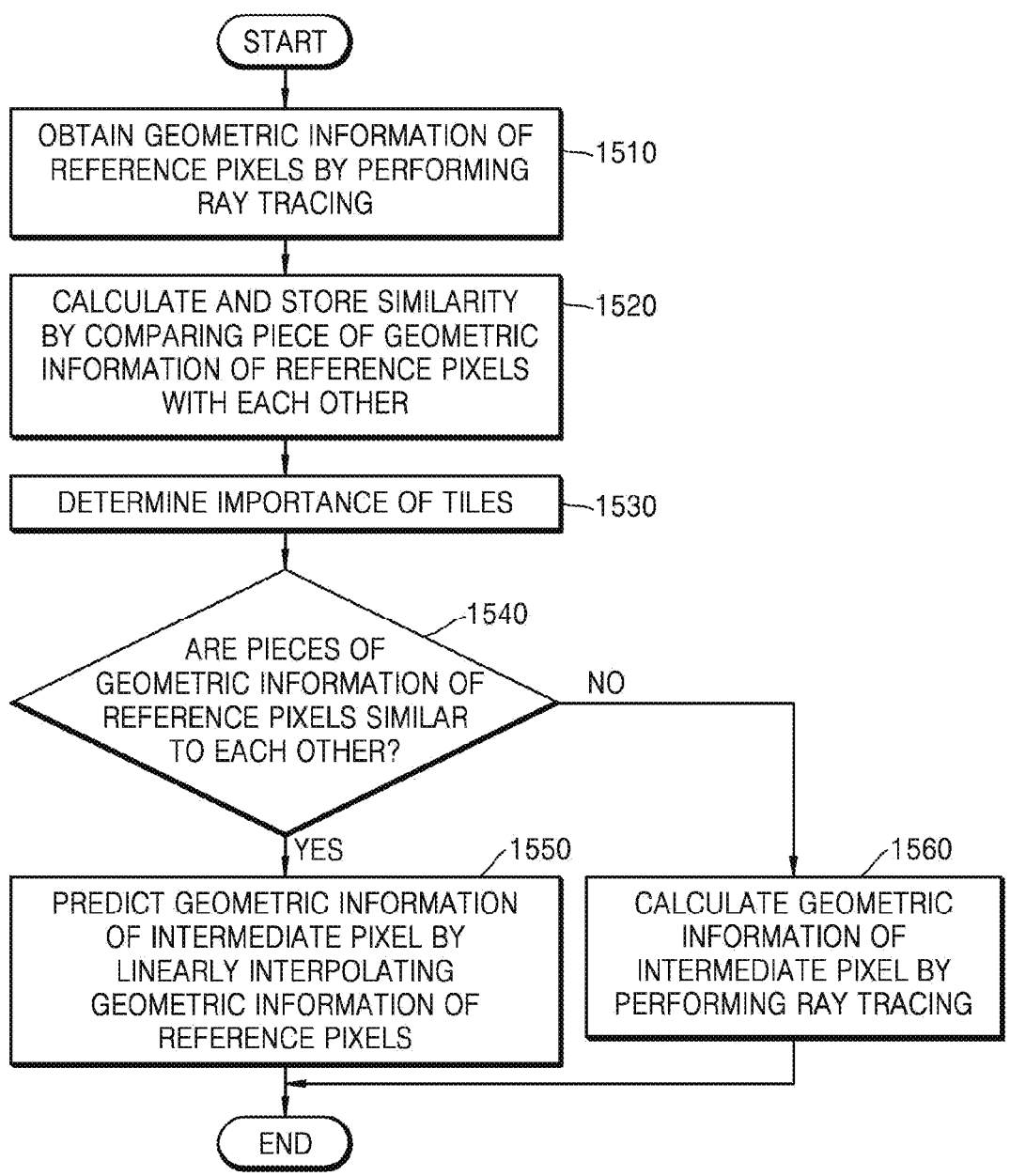
FIG. 15 illustrates a flowchart for an image processing method where a first frame is rendered and similarity and importance of tiles included in the first frame are obtained, according to one or more embodiments.

FIG. 15 illustrates a flowchart for an image processing method where a first frame is rendered and similarity and importance of tiles included in the first frame are obtained, according to one or more embodiments. Briefly, as only a non-limiting example and for simplicity of explanation, the example operations of FIG. 15 will be explained through references to components of the image processing system of FIG. 4, though the same are implementable by other image processing apparatuses or systems, including the image processing apparatus 1900 of FIG. 19, as well as alternative image processing apparatuses or systems.

FIG. 15 illustrates a process of rendering a first tile included in a first frame and obtaining the similarity of the first tile. If the first frame includes a plurality of tiles, the remaining tiles may also be rendered through processes described below, and the similarity of each tile may be obtained.

Figure 16:
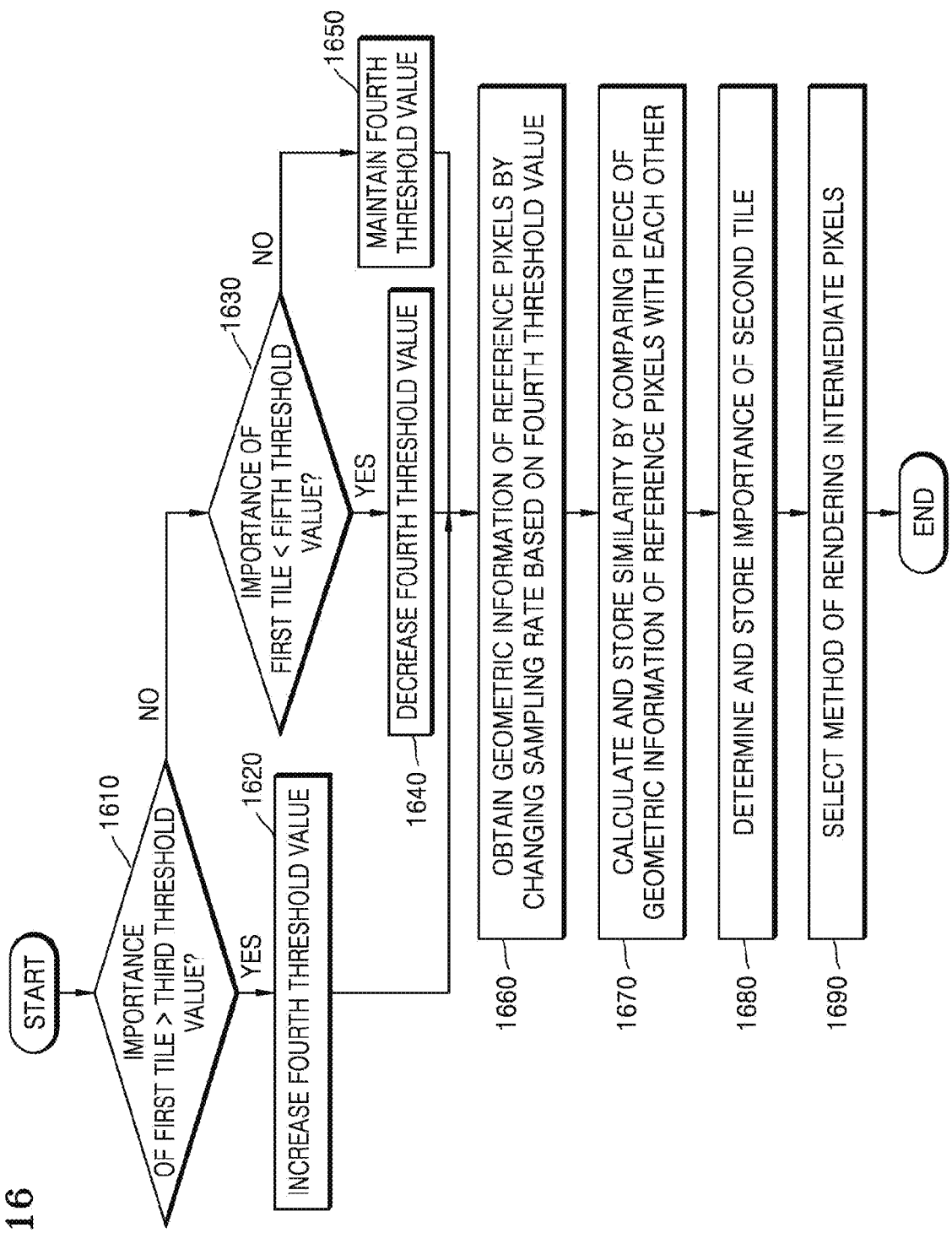
FIG. 16 illustrates a flowchart for an image processing method, according to one or more embodiments.

Operations 1510 and 1520 of FIG. 15 respectively correspond to operations 610 and 620 of FIG. 16. Also, operations 1540 to 1560 of FIG. 15 respectively correspond to operations 630 to 650 of FIG. 16. Hereinafter, therefore, detailed descriptions of operations 1510 and 1520 and operations 1540 to 1560 will be omitted.

In operation 1530, the image processing apparatus 100 determines the importance of the first tile. The image processing apparatus 100 stores the importance of the first tile in the external memory 400. In detail, the image processing apparatus 100 may determine the importance of the first tile based on any one of the examples described with reference to FIGS. 14A and 14B.

Hereinafter, an example in which a second frame is rendered based on the importance of the first frame will be described in detail with reference to FIG. 16.

FIG. 16 illustrates a flowchart for an image processing method, according to one or more embodiments. Briefly, as only a non-limiting example and for simplicity of explanation, the example operations of FIG. 16 will be explained through references to components of the image processing system of FIG. 4, though the same are implementable by other image processing apparatuses or systems, including the image processing apparatus 1900 of FIG. 19, as well as alternative image processing apparatuses or systems.

Referring to FIG. 16, in this example it is assumed that the image processing system completes the rendering of a first frame. An example in which the image processing system renders the first frame is the same as described with reference to FIGS. 5 to 12. Also, a third threshold value and a fifth threshold value may be set when the image processing apparatus 100 is manufactured or may be changed by the user after the image processing apparatus 100 is manufactured.

In operation 1610, the determination unit 110 determines whether the importance of a first tile of the first frame meets or exceeds the third threshold value. If the importance of the first tile meets or exceeds the third threshold value, operation 1620 is performed. Otherwise, if the importance of the first tile fails to meet or does not exceed the third threshold value, operation 1630 is performed.

In operation 1620, the determination unit 110 increases a fourth threshold value. The fourth threshold value is a threshold value used to determine a sampling rate of a second tile, e.g., a tile in a subsequent second frame that corresponds to the first tile. In operation 1610, the importance of the first tile meeting or exceeding the third threshold value means that the importance of the first tile is high. Therefore, the determination unit 110 may increase the fourth threshold value such that the number of reference pixels selected for the second tile is greater than the number of reference pixels selected for the first tile for the rendering of the first tile.

In operation 1630, the determination unit 110 determines whether the importance of the first tile fails to meet or is lower than the fifth threshold value. If the importance of the first tile fails to meet or is lower than the fifth threshold value, operation 1640 is performed. Otherwise, if the importance of the first tile meets or is not lower than the fifth threshold value, operation 1650 is performed. In this example, the fifth threshold value is less than the third threshold value.

In operation 1640, the determination unit 110 decreases the fourth threshold value. In operation 1630, the importance of the first tile that fails to meet or is lower than the fifth threshold value means that the importance of the first tile is low. Therefore, the determination unit 110 decreases the fourth threshold value such that the number of reference pixels selected for the second tile will be smaller than the number of reference pixels selected for the first tile for the rendering of the first tile.

In operation 1650, the determination unit 110 maintains the fourth threshold value. Therefore, the number of reference pixels selected by the determination unit 110 for the second tile may be the same as the number of reference pixels selected for the first tile for the rendering of the first tile.

In operation 1660, based on a result of any of operations 1620, 1640, or 1650, the determination unit 110 selectively changes the sampling rate for the second tile based on the fourth threshold value. The determination unit 110 divides the second tile into a plurality of pixel blocks based on the selectively changed sampling rate and selects a reference pixel from each pixel block.

In an embodiment, the fourth threshold value may correspond to the first threshold value of FIG. 13, e.g., an increase of the fourth threshold value may represent an increase in the qualifier of whether the first tile's similarity is sufficiently high to warrant reducing the sampling rate for the rendering of the second tile in operation 1310 of FIG. 13. For example, when the fourth threshold value is increased, the selection unit 120 may require the similarity of the first tile to be additionally greater than the first threshold value of FIG. 13 (or greater than an increased first threshold controlled by operation 1620) before the sampling rate of the first tile is decreased to be less than the sampling rate that was used to render the first tile. Likewise, when the fourth threshold value is decreased, because of the determined insufficiency of importance of the first tile, the selection unit 120 may not require as high of a similarity of the first tile in operation 1310 before reducing the sampling rate for the second tile, e.g., the sampling rate for the second tile may be reduced compared to the sampling rate used to render the first tile when the similarity of the first tile is greater than a reduced first threshold value controlled by operation 1640.

The selection unit 120 obtains the geometric information of the reference pixels selected for the second tile. In detail, the ray tracing core 200 calculates the geometric information of the reference pixels selected for the second tile, and the selection unit 120 obtains the calculated geometric information from the ray tracing core 200.

In operation 1670, the selection unit 120 calculates the similarity of the second tile by comparing the calculated pieces of geometric information of the reference pixels with each other. The selection unit 120 stores the calculated similarity in the external memory 400. A more detailed explanation of such calculating of the similarity of the second tile, e.g., by the selection unit 120, is described above with reference to FIGS. 6 to 11.

In operation 1680, the selection unit 120 determines the importance of the second tile. The selection unit 120 stores the determined importance in the external memory 400. In detail, the selection unit 120 may determine the importance of the second tile based on any one of the examples described above with reference to FIGS. 14A and 14B.

In operation 1690, the selection unit 120 selects a pixel rendering process to implement to render intermediate pixels included in the second tile. For example, the selection unit 120 may select any one of a linear interpolation pixel rendering process and a ray tracing pixel rendering process, as only examples. A more detailed explanation of such selecting of the pixel rendering process to render the intermediate pixels, e.g., by the selection unit 120, is described above with reference to FIGS. 6 to 11.

As described with reference to FIG. 16, the image processing system 1 may adjust the sampling rate for the second tile based on the determined importance of the first tile. In other words, the higher the importance of the first tile, the more reference pixels that may be selected by the image processing system 1 for the second tile. Also, the lower the importance of the first tile, the less reference pixels that may be selected by the image processing system 1 for the second tile. Therefore, the image processing system 1 may effectively render the second frame based on the rendering of the first frame.

Hereinafter, another example in which the second frame is rendered based on the importance of the first frame will be described in detail with reference to FIG. 17.

Figure 17:
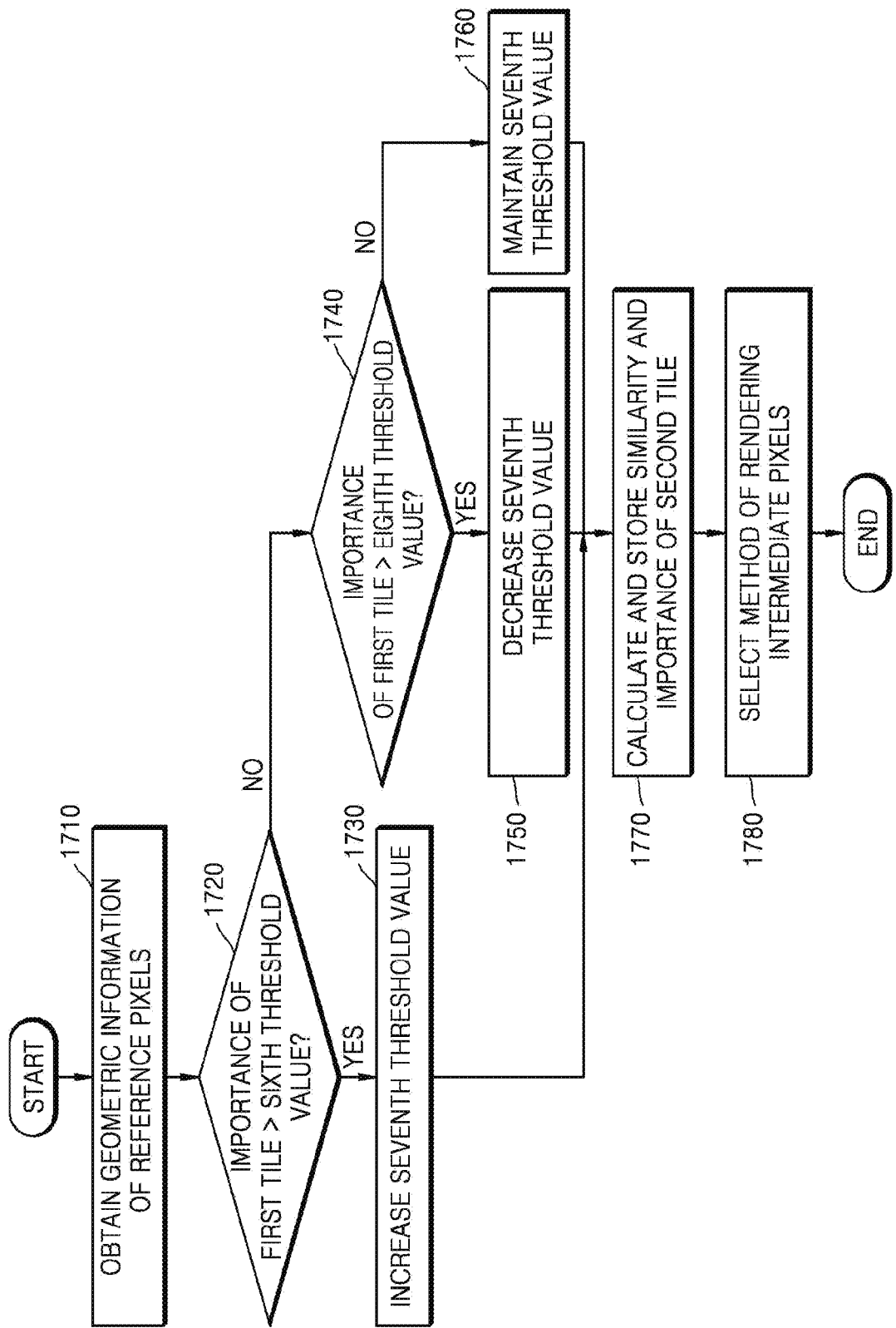
FIG. 17 illustrates a flowchart for an image processing method, according to one or more embodiments.

FIG. 17 illustrates a flowchart for an image processing method, according to one or more embodiments. Briefly, as only a non-limiting example and for simplicity of explanation, the example operations of FIG. 17 will be explained through references to components of the image processing system of FIG. 4, though the same are implementable by other image processing apparatuses or systems, including the image processing apparatus 1900 of FIG. 19, as well as alternative image processing apparatuses or systems.

Referring to FIG. 17, in this example it is assumed that the image processing system 1 completes rendering of the first frame. An example in which the image processing system 1 renders the first frame is the same as described with reference to FIGS. 5 to 12. Also, a sixth threshold value and an eighth threshold value may be set when the image processing apparatus 100 is manufactured or may be changed by the user after the image processing apparatus 100 is manufactured.

As described with reference to FIG. 16, the image processing system 1 may adjust a sampling rate for a second tile, e.g., of a subsequent second frame, based on the determined importance of a corresponding first tile of the first frame. Referring to the flowchart of FIG. 17, the image processing system 1 may adjust a standard of determining the similarity of the second tile, that is, a seventh threshold value, based on the determined importance of the first tile.

In operation 1710, the selection unit 120 obtains the geometric information of the reference pixels selected for the second tile. In this case, the sampling rate that was used to render the first tile may be used or maintained as the sampling rate for the selecting of reference pixels for the second tile. The ray tracing core 200 calculates the geometric information of the reference pixels selected from the second tile, and the selection unit 120 obtains the calculated geometric information from the ray tracing core 200.

In operation 1720, the determination unit 110 determines whether the importance of the first tile meets or exceeds the sixth threshold value. If the importance of the first tile meets or exceeds the sixth threshold value, operation 1730 is performed. Otherwise, if the importance of the first tile fails to meet or does not exceed the sixth threshold value, operation 1740 is performed.

In operation 1730, the determination unit 110 increases the seventh threshold value. The seventh threshold value is a threshold value used to calculate the similarity of the second tile. As only an example, the seventh threshold value may represent criteria used to determine whether two reference pixels, for example, of the second tile are similar, e.g., which may control the selecting between a ray tracing pixel rendering process or an interpolation pixel rendering process to obtain geometric information for intermediate pixels of the second tile or for a next determination of a sampling rate for a tile of a next frame. In operation 1720, the importance of the first tile meeting or exceeding the sixth threshold value means that the importance of the first tile is high. Therefore, the determination unit 110 may increase the seventh threshold value such that a standard for calculating the similarity of the second tile is stricter than the standard that was used to calculate the similarity of the first tile. Briefly, in the above example and in view of the above discussion regarding FIGS. 6-12, with a potential changing of the criteria (or standard) for determining of whether reference pixels of the second tile are similar, e.g., based on the importance of the first tile, the respective selection between the ray tracing pixel rendering process or the interpolation pixel rendering process for the neighboring or nearby intermediate pixels of the second tile may also differ with this potential similarity criteria change. Accordingly, in addition to a sampling rate of the second tile potentially be based on the similarity and/or importance of the first tile, the selection between pixel rendering processes for pixels of the second tile may also be based on rendering results of the first tile.

In operation 1740, the determination unit 110 determines whether the importance of the first tile fails to meet or is lower than the eighth threshold value. If the importance of the first tile fails to meet or is lower than the eighth threshold value, operation 1750 is performed. Otherwise, if the importance of the first tile meets or is not lower than the eighth threshold value, operation 1760 is performed. In this case, the eighth threshold value is less than the sixth threshold value.

In operation 1750, the determination unit 110 decreases the seventh threshold value. In operation 1740, the importance of the first tile being lower than the eighth threshold value means that the importance of the first tile is low. Therefore, the determination unit 110 may decrease the seventh threshold value such that the standard for calculating the similarity of the second tile is less strict than the standard that was used to calculate the similarity of the first tile.

In operation 1760, the determination unit 110 maintains the seventh threshold value. Therefore, the standard for calculating the similarity of the second tile may be the same as the standard that was used to calculate the similarity of the first tile.

In operation 1770, the selection unit 120 calculates the similarity of the second tile by comparing the calculated pieces of the geometric information of the reference pixels of the second tile with each other, e.g., based on the seventh threshold value. The selection unit 120 stores the calculated similarity in the external memory 400. In this case, the selection unit 120 may calculate the similarity of the second tile by using the seventh threshold value adjusted by the determination unit 110.

The selection unit 120 determines the importance of the second tile. The selection unit 120 stores the determined importance in the external memory 400. In detail, the selection unit 120 may determine the importance of the second tile based on any one of the examples described with reference to FIGS. 14A and 14B, for example.

In operation 1780, the selection unit 120 selects a pixel rendering process to implement to render the intermediate pixels included in the second tile. A more detailed explanation of such a selecting of the pixel rendering process to implement to render the intermediate pixels, e.g., by the selection unit 120, is described above with reference to FIGS. 6 to 11.

As described with reference to FIG. 17, the image processing system 1 may adjust a standard for determining the similarity of the second tile based on the determined importance of the first tile. Therefore, the image processing system 1 may effectively render the second frame based on the rendering of the first frame.

Hereinafter, an example of rendering the second frame based on the similarity and importance of the first frame will be described in detail with reference to FIG. 18.

Figure 18:
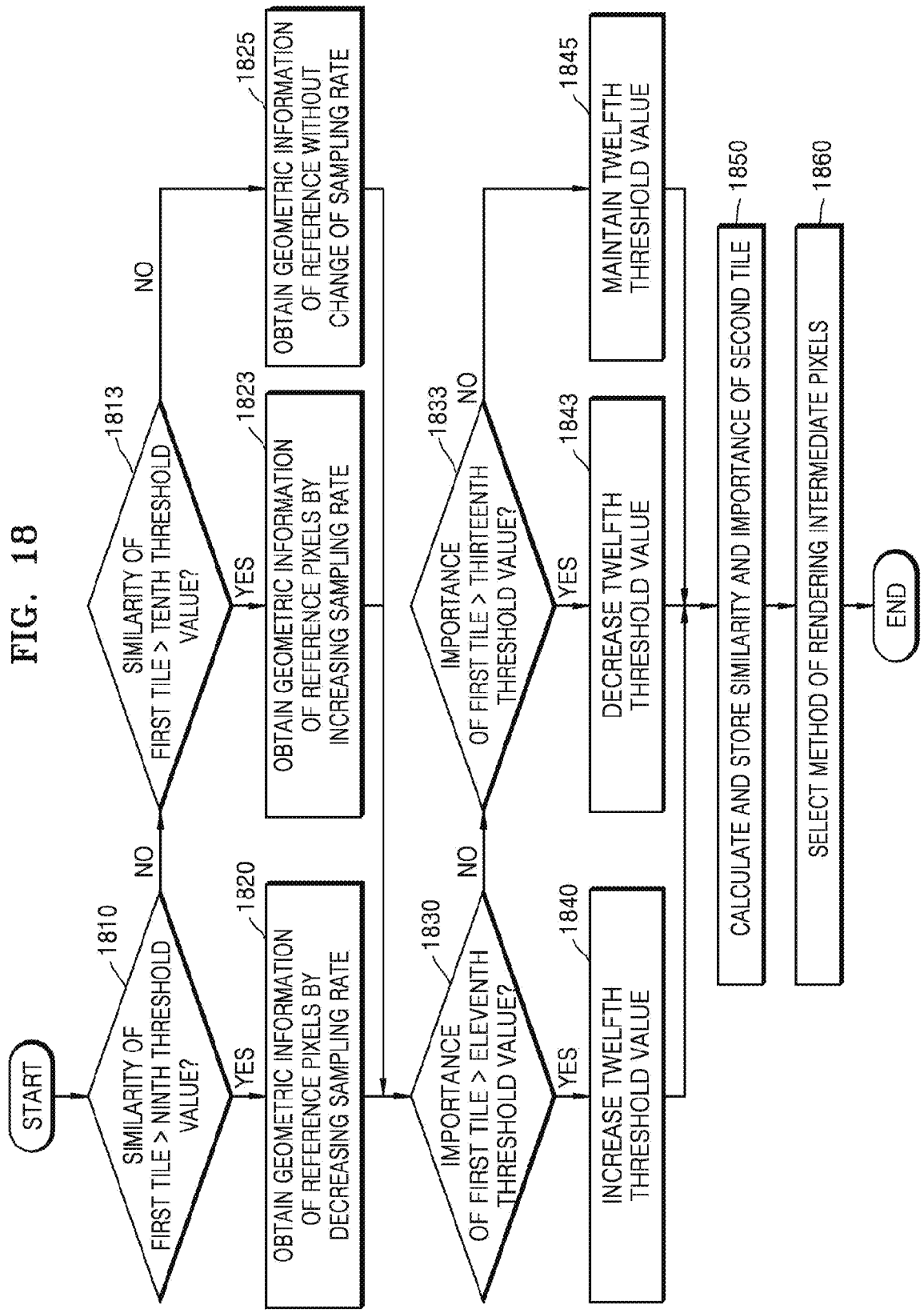
FIG. 18 illustrates a flowchart for an image processing method, according to one or more embodiments.

FIG. 18 illustrates a flowchart for image processing method, according to one or more embodiments. Briefly, as only a non-limiting example and for simplicity of explanation, the example operations of FIG. 18 will be explained through references to components of the image processing system of FIG. 4, though the same are implementable by other image processing apparatuses or systems, including the image processing apparatus 1900 of FIG. 19, as well as alternative image processing apparatuses or systems.

Referring to FIG. 18, in this example, it is assumed that the image processing system 1 completes rendering of a first frame. An example in which the image processing system 1 renders the first frame is the same as described with reference to FIGS. 5 to 12. Also, a ninth threshold value, a tenth threshold value, an eleventh threshold value, and a thirteenth threshold value may be set when the image processing apparatus 100 is manufactured or may be changed after the image processing apparatus 100 is manufactured.

Referring to the flowchart of FIG. 18, the image processing system 1 may adjust a sampling rate for a second tile, e.g., of a subsequent second frame, based on a determined similarity of a corresponding first tile of the first frame. Also, the image processing system 1 adjusts a standard for determining the similarity of the second tile, that is, a twelfth threshold value, based on importance of the first tile.

Operations 1810 to 1825 of FIG. 18 respectively correspond to operations 1310 to 1350 of FIG. 13. Also, operations 1830 to 1860 of FIG. 18 respectively correspond to operations 1720 to 1780 of FIG. 17. Therefore, hereinafter, further detailed descriptions of operations 1810 to 1860 will be omitted.

As described with reference to FIG. 18, and as explained with regard to FIGS. 13 and 17, the image processing system 1 may adjust a standard for determining a sampling rate for the second tile and a standard for determining similarity of the second tile based on the determined similarity and importance of the first tile. Therefore, the image processing system 1 may effectively render the second frame based on the first frame.

Figure 19:
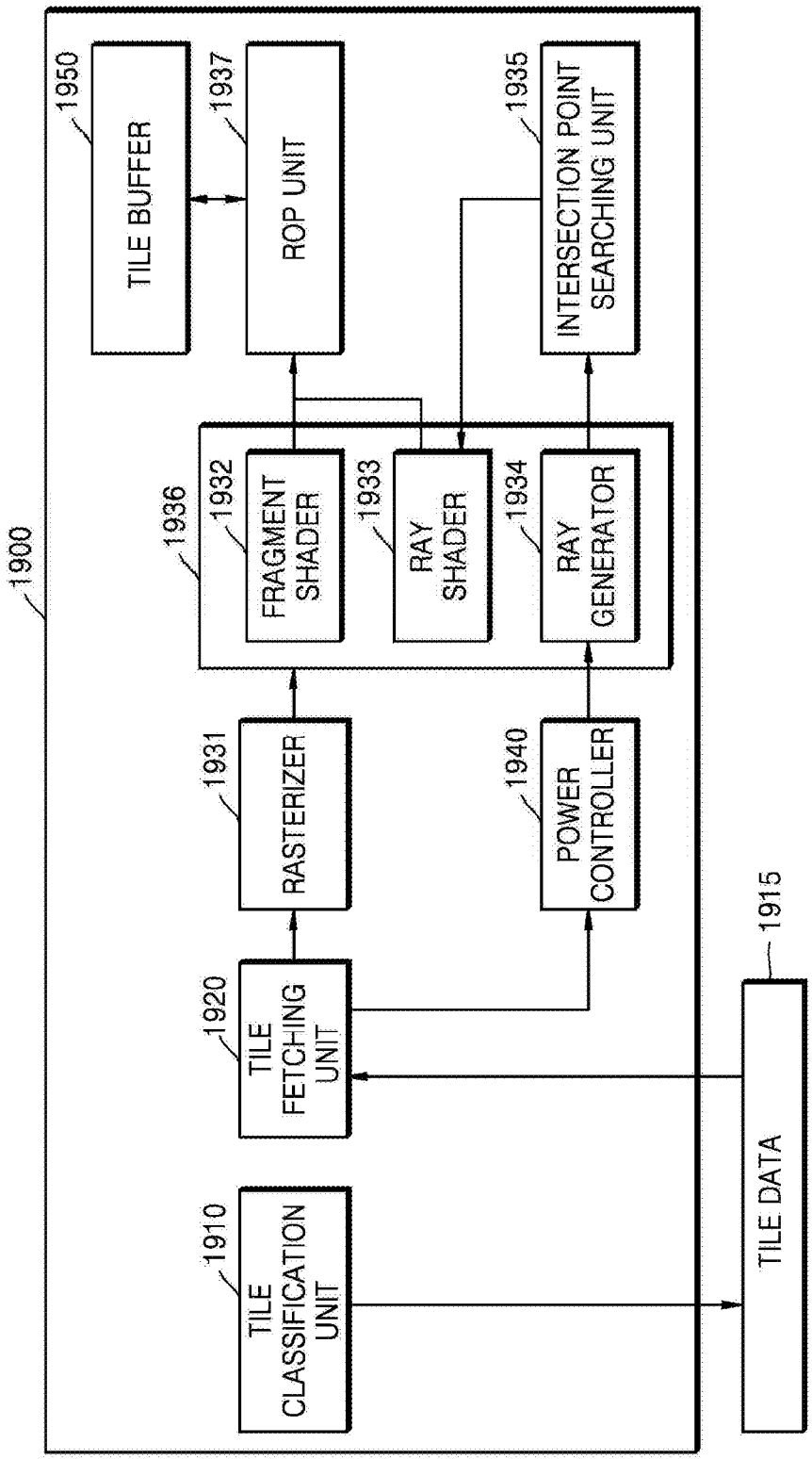
FIG. 19 illustrates an image processing apparatus, according to one or more embodiments.

FIG. 19 illustrates an image processing apparatus, according to one or more embodiments. Briefly, similar to the above discussions regarding FIGS. 1 and 4, though through a different explanation or perspective, the below discussion of FIG. 19 also demonstrates an image processing system/apparatus. Accordingly, depending on embodiment and implementation, the above operations regarding FIGS. 1-18 are similarly implemented by the image processing apparatus of FIG. 19. Therefore, hereinafter, detailed descriptions regarding the components and operation of the image processing apparatus of FIG. 19 with regard to FIGS. 1-18 will be omitted.

Accordingly, the image processing apparatus 1900 may include a tile classification unit 1910, a tile fetching unit 1920, a power controller 1940, a rasterizer 1931, a shader 1936, an intersection point searching unit 1935, a raster operation (ROP) unit 1937, and a tile buffer 1950, for example.

The shader 1936 may include a fragment shader 1932, a ray shader 1933, and a ray generator 1934. The shader 1936 may select a pixel rendering process to implement to render pixels included in a tile of a current frame using similarity or importance information of a corresponding tile of a previous frame. Also, the shader 1936 may calculate the similarity or importance of the tile of the current frame and stores a calculation result in a buffer, similar to the shader 1936 having calculated a similarity or importance of the corresponding tile of the previous frame, for example. Accordingly, the shader 1936 may include a selection unit and interpolation unit similar to the selection unit 120 and interpolation unit 130 of FIG. 4.

A 2D frame may be divided into virtual tiles, and the tile classification unit 1910 may classify the tiles into any one of a first tile group and a second tile group. The tile classification unit 1910 determines reflection or refraction characteristics of primitives included in the tiles and may classify the tiles into any one of the first tile group and the second tile group. In this example, tiles of the first tile group include primitives having reflection or refraction characteristics, while tiles of the second tile group do not include primitives having reflection or refraction characteristics.

Also, the tile classification unit 1910 may calculate the total number of primitives included in the respective tiles, the number of primitives having reflection or refraction characteristics, an area of all primitives, areas of primitives having reflection or refraction characteristics, or the like and may calculate information indicating a determined work load of the respective tiles based on the total number of primitives included in the tiles, the number of primitives having reflection or refraction characteristics, an area of all primitives, areas of primitives having reflection or refraction characteristics, or the like, as only example. The determined work load of the respective tiles may be at least one of a ratio of the total number of primitives included in the tiles to the number of primitives having reflection or refraction characteristics and a ratio of the area of all primitives included in the tiles to the areas of primitives having reflection or refraction characteristics.

The tile classification unit 1910 may store tile data 1915 including classification information of tiles and the determined work load of the tiles in the external memory 400.

The tile fetching unit 1920 may fetch at least one tile among the tiles classified into any one of the first tile and second tile groups and may output the at least one fetched tile to the rasterizer 1931. Also, the tile fetching unit 1920 may determine whether the output tile is a tile of the first tile group or the second tile group.

The rasterizer 1931 may divide primitives included in the tile that is output from the tile fetching unit 1920 into fragments. Accordingly, the rasterizer 1931 may divide primitives included in the output tile when the output tile is from the first tile group and may divide primitives included in the output tile when the output tile is from the second tile group, and may selectively output the resultant divided fragments to the shader 1936.

For example, the rasterizer 1931 may divide a primitive having reflection or refraction characteristics, from among the primitives included in the input tile, when the input tile is from the first tile group, into fragments. The rasterizer 1931 may output the divided fragments to the shader 1936. For example, the rasterizer 1931 may store the divided fragments in the buffer, and the buffer may output the stored fragments to the shader 1936.

Also, the rasterizer 1931 may store the geometric information of the reference pixels selected from the frame in the buffer. The rasterizer 1931 may also determine the sampling rate for the tile of the current frame based on the determined similarity or importance of the corresponding tile of the previous frame and may select the reference pixels for the tile of the current frame based on the determined sampling rate. As only an example, the rasterizer 1931 may include a determination unit, such as the determination unit 110 of FIGS. 1 and 4.

The power controller 1940 may control power of the shader 1936 according to whether the output tile, output to the tile fetching unit 1920, is a tile from the first tile group or a tile from the second tile group. For example, when the output tile, output to the tile fetching unit 1920, is from the first tile group, the shader 1936 may be turned on (that is, power is applied or maintained to the shader 1936), and when the output tile is from the second tile group, the shader 1936 may be turned off (that is, power applied to the shader 1936 is or is maintained blocked). When the output tile is from the second tile group, but fragments included in a previous tile of the same frame are being rendered in the shader 1936, the power controller 1940 may not turn off the shader 1936, for example.

In the case of the fragments of an output tile that have reflection or refraction characteristics, i.e., with the output tile being of the first tile group, ray tracing is used to render a secondary ray, and thus, ray tracing may be performed in the shader 1936.

On the contrary, in the case of the fragments included in an output tile that does not have reflection or refraction characteristics, i.e., with this output tile being of the second tile group, rendering may be performed merely based on the rasterization by the rasterizer 1931, and thus, there may be no need to perform ray tracing in the shader 1936. Accordingly, when the output tile from the tile fetching unit 1920 is of second tile group, power of the shader 1936 may be blocked.

As only an example, in an embodiment, the fragment shader 1932, ray shader 1933, and ray generator 1934 of the shader 1936 and the intersection point searching unit 1935 may correspond to the ray tracing core 200 of FIG. 4. Accordingly, the fragment shader 1932 may be included in a rasterization-based graphics processing unit (GPU) of the image processing apparatus 1900. The fragment shader 1932 may determine color values of fragments. The fragment shader 1932 may determine color values of a primary ray for the fragments that do not require reflection or refraction.

The ray generator 1934 may generate secondary rays for fragments. The ray generator 1934 calculates an intersection point of the primary ray for the fragment (i.e., an intersection point of the primary ray generated for the fragment and an object) by using the geometric information and may generate a secondary ray such as a reflection ray, a refraction ray, a shadow ray, etc., by using the calculated intersection point. In this case, the geometric information may include a triangle ID of the intersection point of a ray and an object, an object ID, a position of the intersection point, a normal vector, texture coordinates, a shadow bit, etc., as only examples, and the geometric information may be calculated in advance and may be stored in an internal memory of the image processing apparatus 1900. As only an example, in an embodiment, the ray generator 1934 may correspond to and/or represent the ray generation unit of the ray tracing core 200 of FIG. 4.

The intersection point searching unit 1935 may be included in a ray tracing-based GPU of the image processing apparatus 1900 and may include a TRV unit and an IST unit. The intersection point searching unit 1935 searches for an acceleration structure indicating a relationship between objects in a 3D space by applying a KD tree, BVH, etc., and may calculate an intersection point and color values of a ray. The calculated intersection point and color values may be output to the ray shader 1933. As only an example, in an embodiment, the TRV unit and IST unit of the intersection point searching unit 1935 may correspond to and/or represent the traversal unit and intersection unit the ray tracing core 200 of FIG. 4.

The ray shader 1933 may determine color values of the secondary rays for the fragments based on information about an intersection point of the secondary rays for the fragments and material characteristics of the intersection point. Also, based on the color values of the secondary rays and values of colors (i.e., color values of the primary ray for the fragment) that are shaded by rasterizing the fragments, the color values of the secondary rays for the fragments may be determined. Accordingly, the ray shader 1933 may determine color values of the secondary rays for the fragments by taking basic colors of a material of the intersection point, an effect caused by a light source, etc. into account. As only an example, in an embodiment, the ray shader 1933 may correspond to and/or represent the shading unit of the ray tracing core 200 of FIG. 4.

The ROP unit 1937 may determine a visibility relationship between (an order of) fragments by conducting a depth test of the fragments that are rendered by rasterization or ray tracing. Accordingly, the ROP unit 1937 may determine final values of pixels included in tiles stored in the tile buffer 1950. When the values of the pixels included in the tiles are determined, the tiles may be output to a frame buffer.

As described above, in one or more embodiments, an image processing apparatus or system may adaptively adjust a sampling rate for a tile included in a current frame that is to be currently rendered, based on a determined similarity or importance of a corresponding tile included in previously rendered frame. The image processing apparatus or system may determine which pixel rendering process, of differing available pixel rendering processes, to implement to render pixels of the tile included in the current frame. Therefore, the image processing apparatus or system may adaptively adjust the number of pixels that are rendered by ray tracing, and thus, costs (e.g., a time or power) required to render a frame may be decreased while the quality of an image may be maintained.

The apparatuses, units, modules, devices, and other components illustrated in FIGS. 1, 4, and 19 for example, that may perform operations described herein with respect to FIGS. 2-3 and 5-18, for example, are implemented by hardware components. Examples of hardware components include controllers, sensors, memory, drivers, and any other electronic components known to one of ordinary skill in the art. In one example, the hardware components are implemented by one or more processing devices, or processors, or computers. A processing device, processor, or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing computer readable code, instructions, or software that are executed by the processing device, processor, or computer and that may control the processing device, processor, or computer to implement one or more methods described herein. Hardware components implemented by a processing device, processor, or computer, e.g., by implementing computer execute code, instructions, or software, such as an operating system (OS) and one or more software applications that run on the OS, may perform the operations described herein with respect to FIGS. 2-3 and 5-18, as only an example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-3 and 5-18 that perform the operations described herein may be performed by a processing device, processor, or a computer as described above executing processor or computer readable code, instructions, or software to perform the operations described herein.

Processor or computer readable code, instructions, or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the processor or computer readable code, instructions, or software include machine code that is directly executed by the processing device, processor, or computer, such as machine code produced by a compiler. In another example, the processor or computer readable code, instructions, or software include higher-level code that is executed by the processing device, processor, or computer using an interpreter. Based on the disclosure herein, and after an understanding of the same, programmers of ordinary skill in the art can readily write the processor or computer readable code, instructions, or software based on the block diagrams and the flow charts illustrated in the drawings and the corresponding descriptions in the specification, which disclose algorithms for performing the operations performed by the hardware components and the methods as described above.

The processor or computer readable code, instructions, or software to control a processing device, processor, or computer to implement the hardware components, such as discussed in any of FIGS. 1, 4, and 19, and perform the methods as described above in any of FIGS. 2-3 and 5-18, and any associated data, data files, and data structures, are recorded, stored, or fixed in or on one or more non-transitory computer-readable storage media. Examples of a non-transitory processor or computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the processor or computer readable code, instructions, or software and any associated data, data files, and data structures in a non-transitory manner and providing the processor or computer readable code, instructions, or software and any associated data, data files, and data structures to a processing device, processor, or computer so that the processing device, processor, or computer can execute the instructions. In one example, the processor or computer readable code, instructions, or software and any associated data, data files, and data structures are distributed over network-coupled computer systems so that the instructions and software and any associated data, data files, and data structures are stored, accessed, and executed in a distributed fashion by the processing device, processor, or computer.

As a non-exhaustive example only, an electronic device embodiment herein as the image processing apparatus or system may include a mobile device, such as a cellular phone, a smart phone, a wearable smart device, a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

What is claimed is:

1. An image processing method, the method comprising:
   rendering, using at least one processor, a tile of a first frame of an image using a first sampling rate;
   determining, using the at least one processor, a second sampling rate for a tile of a second frame of the image corresponding to the tile of the first frame based on a rendering result of the first frame;
   dividing, using the at least one processor, the tile of the second frame into a number of pixel blocks, each of the pixel blocks including a plurality of pixels, based on the determined second sampling rate;
   selecting, using the at least one processor, reference pixels from the pixel blocks based on the determined second sampling rate;
   obtaining, using the at least one processor, geometric information of the reference pixels by performing ray tracing on the reference pixels;
   obtaining, using the at least one processor, geometric information of an intermediate pixel of the tile by selecting, based on the obtained geometric information of the reference pixels, a pixel rendering process to render the intermediate pixel; and
   performing, using the at least one processor, the selected pixel rendering process for the intermediate pixel.

2. The method of claim 1, wherein the selecting of the pixel rendering process includes:
   selecting between one of ray tracing the intermediate pixel to obtain the geometric information of the intermediate pixel, and interpolating the intermediate pixel based on two or more of the reference pixels to obtain the geometric information of the intermediate pixel.

3. The method of claim 1, wherein the second sampling rate of the tile of the second frame is selectively, based on a determined similarity of the tile of the first frame that corresponds to the tile of the second frame, determined to be one of lower than the first sampling rate used to render the corresponding tile of the first frame, higher than the first sampling rate used to render the corresponding tile of the first frame, and same as the first sampling rate used to render the corresponding tile of the first frame.

4. The method of claim 1, wherein, in the determining of the second sampling rate for the tile of the second frame,
   the second sampling rate for the tile of the second frame is determined to be lower than the first sampling rate used to render the corresponding tile of the first frame when a determined similarity of the corresponding tile of the first frame is determined to meet a first threshold; and
   the second sampling rate for the tile of the second frame is determined to be higher than the first sampling rate used to render the corresponding tile of the first frame when the determined similarity of the corresponding tile of the first frame is determined to not meet a second threshold.

5. The method of claim 4, wherein the determined similarity of the corresponding tile of the first frame is a previously determined similarity between selected reference pixels of the corresponding tile of the first frame calculated based on obtained geometric information of the selected reference pixels of the corresponding tile of the first frame and intermediate pixels of the first frame adjacent to the selected reference pixels of the corresponding tile of the first frame.

6. The method of claim 1, further comprising:
obtaining, using the at least one processor, a previously determined similarity and a previously determined importance of the tile of the first frame,
wherein the determining of the second sampling rate for the tile of the second frame comprises determining the second sampling rate for the tile of the second frame based on the obtained similarity and the obtained importance.

7. The method of claim 6, wherein the determining of the second sampling rate for the tile of the second frame is based on a determination of whether the obtained similarity is determined to meet a threshold, with the threshold being greater when the obtained importance of the first tile meets an importance threshold compared to when the obtained importance of the first tile is determined to not meet the importance threshold.

8. The method of claim 1, further comprising:
obtaining, using the at least one processor, a previously determined similarity and previously determined importance of the tile of the first frame that is determined to correspond to the tile of the second frame,
wherein the selecting of the pixel rendering process comprises selecting the pixel rendering process based on a determined similarity between the reference pixels, the determination of the similarity between the reference pixels being dependent on the obtained importance.

9. The method of claim 8, wherein the selecting of the pixel rendering process further comprises:
determining whether the obtained importance meets an importance threshold; and
based on a result of the determining of whether the obtained importance meets the importance threshold, selecting between using one of a greater, lesser, or same similarity threshold between the reference pixels to select a first pixel rendering process, instead of selecting a second pixel rendering process, to render the intermediate pixel compared to a similarity threshold between reference pixels of the tile of the first frame that was used to control which of the first pixel rendering process and the second pixel rendering process was selected to render an intermediate pixel of the tile of the first frame.

10. The method of claim 1, further comprising:
obtaining, using the at least one processor, a previously determined similarity and previously determined importance of the tile of the first frame that is determined to correspond to the tile of the second frame,
wherein the determining of the second sampling rate of the second tile comprises determining the second sampling rate of the second tile based on the obtained similarity and the obtained importance, and
the selecting of the pixel rendering process comprises selecting the pixel rendering process based on the obtained importance and a determined similarity between the reference pixels of the second tile.

11. The method of claim 1, further comprising:
dividing, using the at least one processor, each of plural tiles included in the first frame into pixel blocks, respectively including a plurality of pixels, and selecting a respective reference pixel of the first frame from each of the pixel blocks;
calculating, using the at least one processor, respective similarities between the reference pixels of the first frame and/or intermediate pixels of the first frame adjacent to the reference pixels of the first frame based on determined geometric information of the reference pixels of the first frame; and
selecting, using the at least one processor, respective pixel rendering processes to render the intermediate pixels of the first frame based on the calculated respective similarities,
wherein the determining of the second sampling rate for the second tile comprises determining respective second sampling rates for each tile included in the second frame based on the calculated respective similarities.

12. A non-transitory computer-readable recording medium comprising computer readable code to control at least one processing device to implement the method of claim 1.

13. An image processing apparatus, the apparatus comprising:
a memory having computer readable instructions stored thereon; and
at least one processor configured to execute the computer readable instructions to,
render a tile of a first frame of an image using a first sampling rate;
determine a second sampling rate for a of tile of a second frame of the image corresponding to the tile of the first frame based on a rendering result of the first frame;
divide the tile of the second frame into a number of pixel blocks, each of the pixel blocks including a plurality of pixels, based on the determined second sampling rate;
select reference pixels from the pixel blocks based on the determined second sampling rate;
select, based on determined geometric information of the reference pixels, a pixel processing process to render an intermediate pixel included in the second frame,
wherein the determined geometric information the reference pixels is obtained by performing respective ray tracing for each of the reference pixels;
perform the selected pixel rendering process for the intermediate pixel.

14. The apparatus of claim 13, wherein, in the determining of the second sampling rate for the tile of the second frame, the at least one processor is further configured to:
determine the second sampling rate of the tile of the second frame to be lower than the first sampling rate used to render the corresponding tile of the first frame when a determined similarity of the corresponding tile of the first frame is determined to meet a first threshold; and
determine the second sampling rate for the tile of the second frame is higher than the first sampling rate used to render the corresponding tile of the first frame when the determined similarity of the corresponding tile of the first frame is determined to not meet a second threshold.

15. The apparatus of claim 14, wherein the determined similarity of the corresponding tile of the first frame is a previously determined similarity between selected reference pixels of the corresponding tile of the first frame calculated based on obtained geometric information of the selected reference pixels of the corresponding tile of the first frame and intermediate pixels of the first frame adjacent to the selected reference pixels of the corresponding tile of the first frame.

16. The apparatus of claim 13, wherein the at least one processor is further configured to:
   obtain a previously determined similarity and a previously determined importance of the tile of the first frame from the memory; and
   determine the second sampling rate of the tile of the second frame based on the obtained similarity and the obtained importance.

17. The apparatus of claim 16, wherein, in the determining of the second sampling rate for the tile of the second frame, the at least one processor is further configured to:
   determine the second sampling rate for the tile of the second frame based on a determination of whether the obtained similarity meets a threshold, with the threshold being greater when the obtained importance of the first tile is determined to meet an importance threshold compared to when the obtained importance of the first tile is determined to not meet the importance threshold.

18. The apparatus of claim 13, wherein the at least one processor is configured to:
   obtain a previously determined importance of the tile of the first frame from the memory; and
   select the pixel rendering process based on a determined similarity between the reference pixels, the determination of the similarity between the reference pixels being dependent on the obtained importance.

19. The apparatus of claim 18, wherein the at least one processor is configured to:
   determine whether the obtained importance meets an importance threshold; and
   based on a result of the determining whether the obtained importance meets the importance threshold, select between using one of a greater, lesser, or same similarity threshold between the reference pixels to select a ray tracing pixel rendering process, instead of selecting an interpolation pixel rendering process, to render an intermediate pixel compared to a similarity threshold between reference pixels of the tile of the first frame that was used to control which of the ray tracing pixel rendering process and the interpolation pixel rendering process was selected to render an intermediate pixel of the tile of the first frame.

20. The apparatus of claim 13, wherein the at least one processor is further configured to:
   divide each of plural tiles included in the first frame into pixel blocks, respectively including a plurality of pixels;
   select a respective reference pixel of the first frame from each of the pixel blocks; and
   calculate respective similarities between the reference pixels of the first frame and/or intermediate pixels of the first frame adjacent to the reference pixels of the first frame based on determined geometric information of the reference pixels of the first frame;
   store the calculated respective similarities in the memory;
   select respective pixel rendering processes to render the intermediate pixels of the first frame based on the calculated respective similarities, to obtain the calculated respective similarities from the memory; and
   determine respective second sampling rates of each tile included in the second frame based on the obtained calculated respective similarities.

* * * * *